United States Patent
Huang et al.

(10) Patent No.: US 11,630,491 B2
(45) Date of Patent: Apr. 18, 2023

(54) ROTATING SHAFT CONNECTION MECHANISM AND FOLDABLE DEVICE

(71) Applicant: HUAWEI TECHNOLOGIES CO., LTD., Shenzhen (CN)

(72) Inventors: Bo Huang, Shanghai (CN); Hideo Kato, Yokohama (JP); Weihua Mao, Shanghai (CN); Haowen Xu, Shanghai (CN); Yi-Hsiang Liao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 248 days.

(21) Appl. No.: 17/266,118

(22) PCT Filed: Aug. 7, 2018

(86) PCT No.: PCT/CN2018/099132
§ 371 (c)(1),
(2) Date: Feb. 5, 2021

(87) PCT Pub. No.: WO2020/029062
PCT Pub. Date: Feb. 13, 2020

(65) Prior Publication Data
US 2021/0208641 A1 Jul. 8, 2021

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC ..... G06F 1/1681; G06F 1/1652; G06F 1/1616
See application file for complete search history.

(56) References Cited

U.S. PATENT DOCUMENTS

| 2015/0052707 A1 | 2/2015 | Lin |
| 2015/0233162 A1 | 8/2015 | Lee et al. |
| (Continued) | | |

FOREIGN PATENT DOCUMENTS

| CN | 202979051 U | 6/2013 |
| CN | 203057218 U | 7/2013 |
| (Continued) | | |

OTHER PUBLICATIONS

Notice of Allowance for Japanese Application No. 2021-506431 dated Apr. 5, 2022, 3 pages.

(Continued)

*Primary Examiner* — Anthony Q Edwards

(57) ABSTRACT

A rotating shaft connection mechanism includes two rotating shafts, two connection assemblies corresponding to the two rotating shafts, and one synchronous driving block, where each connection assembly includes a slide rail block and a drive sheet, a boss of the slide rail block is inserted into a slanting groove on the drive sheet, the synchronous driving block is connected to the two rotating shafts, and the synchronous driving block is disposed on two sides of a connecting piece on the drive sheet by using provided connecting pieces, and is inserted into a spiral groove by using a provided positioning protrusion part. In this way, through fitting connection between the two rotating shafts, the one synchronous driving block and the slide rail blocks and drive sheets of the two connection assemblies corresponding to the two rotating shafts, rotation of the rotating shaft is converted into sliding of the slide rail block.

13 Claims, 19 Drawing Sheets

(56) References Cited

U.S. PATENT DOCUMENTS

| | | | |
|---|---|---|---|
| 2015/0327383 | A1 | 11/2015 | Hsu |
| 2018/0059740 | A1 | 3/2018 | Kato |
| 2018/0355961 | A1* | 12/2018 | Hsu .................. F16H 15/36 |
| 2021/0018960 | A1* | 1/2021 | Kato ................. G06F 1/1681 |
| 2021/0208641 | A1* | 7/2021 | Huang ............... H04M 1/0268 |
| 2022/0261040 | A1* | 8/2022 | Liu ..................... H04M 1/022 |

FOREIGN PATENT DOCUMENTS

| | | | |
|---|---|---|---|
| CN | 203655884 | U | 6/2014 |
| CN | 104421325 | A | 3/2015 |
| CN | 204669459 | U | 9/2015 |
| CN | 105549687 | A | 5/2016 |
| CN | 105650106 | A | 6/2016 |
| CN | 205750631 | U * | 11/2016 |
| CN | 205750631 | U | 11/2016 |
| CN | 106453711 | A | 2/2017 |
| CN | 106788536 | A | 5/2017 |
| CN | 206451165 | U | 8/2017 |
| CN | 206918043 | U | 1/2018 |
| CN | 207117713 | U | 3/2018 |
| CN | 108200248 | A | 6/2018 |
| CN | 207460248 | U | 6/2018 |
| CN | 207560064 | U | 6/2018 |
| EP | 2518609 | A1 | 10/2012 |
| EP | 3393110 | A1 | 10/2018 |
| JP | 2018071719 | A | 5/2018 |
| KR | 20100042833 | A | 4/2010 |
| KR | 20130073331 | A | 7/2013 |
| KR | 20150096827 | A | 8/2015 |
| KR | 20150130652 | A | 11/2015 |
| KR | 20160124317 | A | 10/2016 |

OTHER PUBLICATIONS

Chinese Office Action dated Sep. 27, 2020 for Application No. 201880074631.4, 8 pages.
Extended European Search Report for Application No. 18929790.6 dated Jun. 30, 2021, 11 pages.
PCT International Search Report for PCT/CN2018/099132 dated Aug. 7, 2018, 8 pages.
Korean Intellectual Property Office Notice of Allowance for Application No. 10-2021-7002389 dated Jun. 22, 2022, 5 pages.

* cited by examiner

ROTATING SHAFT CONNECTION MECHANISM AND FOLDABLE DEVICE

CROSS-REFERENCE TO RELATED APPLICATIONS

This application is a national stage of International Application No. PCT/CN2018/099132, filed on Aug. 7, 2018, which is hereby incorporated by reference in its entirety.

TECHNICAL FIELD

This application relates to the field of electronic devices, and more specifically, to a rotating shaft connection mechanism and a foldable device.

BACKGROUND

As a flexible organic light-emitting diode (OLED) technology becomes more mature, a device with a foldable screen (for example, a foldable mobile phone) is to become a mainstream direction in the next few years.

In a device with a foldable screen, to avoid damage to the screen, it is required that a size of the screen does not change during unfolding or folding of the screen. Therefore, a rotating shaft connection mechanism needs to be urgently provided, to ensure that a length of the screen remains unchanged during unfolding or folding of the screen.

SUMMARY

Various embodiments provide a rotating shaft connection mechanism and a foldable device, to enable a length of a screen to remain unchanged during unfolding or folding of the screen.

According to a first aspect, a rotating shaft connection mechanism is provided, where the rotating shaft connection mechanism includes:

two rotating shafts, two connection assemblies corresponding to the two rotating shafts, and one synchronous driving block, where the connection assembly includes a slide rail block and a drive sheet, where the rotating shafts are each provided with a spiral groove, and the spiral grooves on the two rotating shafts have opposite rotation directions;

the slide rail block is provided with a boss protruding towards the drive sheet;

the drive sheet is disposed between the slide rail block and the rotating shaft corresponding to the connection assembly, and is provided with a slanting groove that can enable the boss of the slide rail block to be inserted, and a connecting piece is disposed on the drive sheet, where on a side that is of the spiral groove of the rotating shaft corresponding to the connection assembly and that is away from an end portion of the rotating shaft, the connecting piece is sleeved on the rotating shaft corresponding to the connection assembly; and the synchronous driving block is disposed between the two rotating shafts, a positioning protrusion part that can be inserted into the spiral groove of each rotating shaft, and a first connecting piece and a second connecting piece that are sleeved outside each rotating shaft are sequentially disposed in a first direction, the first connecting piece and the second connecting piece are disposed on two sides of the connecting piece on the drive sheet, and the first direction is parallel to an axial direction of each rotating shaft.

Therefore, the rotating shaft connection mechanism provided in this embodiment of this application is provided with the two rotating shafts, the synchronous driving block, and the connection assembly corresponding to each rotating shaft. The connection assembly includes the slide rail block and the drive sheet. The synchronous driving block drives the two rotating shafts to synchronously rotate, drives the drive sheet to slide in the first direction parallel to the axial direction of the rotating shaft, and drives, based on the slanting groove on the drive sheet, the slide rail block in fitting connection with the drive sheet to slide in a direction away from or towards the rotating shaft. Finally, rotation of the rotating shaft is converted into sliding of the slide rail block. When the rotating shaft connection mechanism is disposed on a device with a flexible screen, the slide rail block is connected to a housing of the device, and finally drives the housing of the device to slide in a direction away from or towards the rotating shaft. In this way, during folding of the flexible screen, effective accommodation space can be provided for a bending area of the flexible screen through movement of the rotating shaft connection mechanism. During unfolding of the flexible screen, the flexible screen can be slowly unfolded into a plane through movement of the rotating shaft connection mechanism. Both the cases effectively ensure that a length of the flexible screen remains unchanged, thereby improving user experience.

In addition, both a function of driving the drive sheet to slide in the first direction and a function of implementing synchronous rotation of the two rotating shafts are implemented by using the synchronous driving block. On one hand, a relative error between rotation of the rotating shaft and sliding of the drive sheet and the slide rail block can be effectively controlled, thereby improving overall precision of the rotating shaft. On the other hand, if one rotating shaft rotates, the other rotating shaft can be relatively quickly driven to rotate, thereby reducing a stuck problem caused by lagging rotation of the rotating shaft, and improving user experience.

The drive sheet can simultaneously implement sliding of the drive sheet in the first direction and driving the slide rail block to slide in the direction away from or towards the rotating shaft, and tolerance accumulation is small, so that a relative error between rotation and sliding can be relatively well controlled, and resistance during sliding of the slide rail block can be relatively well controlled, thereby improving user experience regarding an operating force.

In one implementation, the slide rail block further includes:

two grooves whose openings face opposite directions are respectively disposed at positions that are close to two end portions of the slide rail block in the first direction; and the connection assembly further includes:

a sliding sheet, disposed between the slide rail block and the rotating shaft corresponding to the connection assembly, and provided with two protruding end portions of the two grooves corresponding to the slide rail block, where each of the protruding end portions is inserted into a corresponding groove in the slide rail block, the sliding sheet is rotatably connected to the rotating shaft corresponding to the connection assembly, and the sliding sheet is slidably connected to the drive sheet in the first direction.

Therefore, connection between the protruding end portions of the sliding sheet disposed in the rotating shaft connection mechanism and the grooves in the slide rail block can effectively ensure that the slide rail block moves in a straight line in only one direction (that is, a width direction of the slide rail block) as much as possible when the slide rail block moves relative to the rotating shaft.

In one implementation, the connection assembly further includes:

at least one sliding sheet fixing block, where each sliding sheet fixing block is rotatably connected to the rotating shaft corresponding to the connection assembly, and each sliding sheet fixing block is fixedly connected to the sliding sheet.

Therefore, it is simple and practical to connect the sliding sheet and the rotating shaft by using the sliding sheet fixing block by disposing the sliding sheet fixing block on the rotating shaft connection mechanism.

In one implementation, the rotating shaft corresponding to the connection assembly is a variable-diameter shaft, each sliding sheet fixing block is rotatably connected to a first part of the rotating shaft corresponding to the connection assembly, and a radius of the first part is less than a radius of a part provided with a spiral groove in the rotating shaft corresponding to the connection assembly.

In one implementation, the rotating shaft connection mechanism further includes:

a lifting block assembly, where the lifting block assembly includes a screen support lifting block and two eccentric wheels corresponding to the two rotating shafts, where the two eccentric wheels are fixedly connected to a same end of each of the two rotating shafts respectively, and the two eccentric wheels are slidably connected to the screen support lifting block, so that when each of the rotating shafts rotates, the eccentric wheel corresponding to the rotating shaft rotates around the rotating shaft to drive the screen support lifting block to move in the first direction.

Therefore, according to the rotating shaft connection mechanism provided in this embodiment of this application, the lifting block assembly including the eccentric wheel and the screen support lifting block is disposed on the rotating shaft, the eccentric wheel is fixed to the rotating shaft, and the screen support lifting block is slidably connected to the eccentric wheel. When the rotating shaft rotates, the eccentric wheel fixed to the rotating shaft can be enabled to rotate with the rotating shaft, and drive the screen support lifting block to move in the first direction parallel to the axial direction of the rotating shaft, thereby implementing good shaft support between the rotating shafts, providing a relatively good support force for the flexible screen, and improving user experience. In addition, because the lifting block assembly is connected to the rotating shaft, the rotating shaft connection mechanism also increases strength and anti-twisting performance of a device on the whole.

In one implementation, the connection assembly further includes:

a screen support flap, where one end of the screen support flap is fixedly connected to one end of the rotating shaft corresponding to the connection assembly, and when the rotating shaft connection mechanism is disposed on a device, the other end of the screen support flap is slidably connected to a slanting movable slide rail in a housing of the device, so that when the rotating shaft corresponding to the connection assembly rotates, the screen support flap slides in the slanting movable slide rail.

Therefore, the screen support flap is disposed in the rotating shaft connection mechanism, so that after a flexible screen of the device on which the rotating shaft connection mechanism is disposed is in an unfolded state, the screen support flap can be used to provide a support force for the flexible screen, to support the flexible screen.

In one implementation, the rotating shaft connection mechanism further includes a fixing block sleeved outside the two rotating shafts; and one end of the screen support flap in the connection assembly is fixedly connected to the rotating shaft corresponding to the connection assembly by using the fixing block.

In one implementation, a direction of the slanting groove of the drive sheet in the connection assembly corresponding to each rotating shaft is opposite to a rotation direction of the spiral groove of each rotating shaft; or a direction of the slanting groove of the drive sheet in the connection assembly corresponding to each rotating shaft is the same as a rotation direction of the spiral groove of each rotating shaft.

In one implementation, the rotating shaft connection mechanism further includes:

a damping sheet, at a position close to the end portions of the two rotating shafts, where the damping sheet is in interference fit with the two rotating shafts.

Therefore, disposing the damping sheet in the rotating shaft connection mechanism can increase resistance during rotation of the rotating shaft. In this way, when the rotating shaft connection mechanism is disposed on the device, resistance during folding or unfolding of the device can be increased by using the resistance increased by the damping sheet during rotation of the rotating shaft, so that the device can maintain a stable state at any angle within a specific angle range during folding or unfolding of the device.

In one implementation, the rotating shaft connection mechanism further includes:

a dual-shaft fixing block, where the dual-shaft fixing block is rotatably connected to the two rotating shafts on one side of the spiral groove of each rotating shaft close to the end portion of the rotating shaft.

Therefore, disposing the dual-shaft fixing block in the rotating shaft connection mechanism can enable a distance between the two rotating shafts of the rotating shaft connection mechanism to remain unchanged during synchronous rotation of the two rotating shafts.

In one implementation, an angle between a direction of the slanting groove on the drive sheet and a length direction of the drive sheet is related to a sliding amount of the slide rail block sliding in a direction towards or away from the rotating shaft corresponding to the connection assembly and a sliding amount of the drive sheet in the first direction. The length direction of the drive sheet is perpendicular to the axial direction of the rotating shaft corresponding to the connection assembly, and when the rotating shaft connection mechanism is disposed on a device, the length direction of the drive sheet is perpendicular to a thickness direction of the device.

In one implementation, the angle is 45°.

According to a second aspect, a foldable device is provided, where the device includes:

a foldable flexible screen; and at least one rotating shaft connection mechanism according to any one of the foregoing first aspect, where each rotating shaft connection mechanism is disposed under the flexible screen, and the slide rail block in each rotating shaft connection mechanism is connected to a housing of the device.

Therefore, the foldable flexible screen and the at least one rotating shaft connection mechanism are disposed on the foldable device provided in this embodiment of this application. Each rotating shaft connection mechanism includes two rotating shafts, one synchronous driving block, and a connection assembly corresponding to each rotating shaft. The connection assembly includes a slide rail block and a drive sheet. The synchronous driving block drives the two rotating shafts to synchronously rotate, drives the drive sheet to slide in a first direction parallel to an axial direction of the rotating shaft, and drives, based on a slanting groove on the drive sheet, the slide rail block in fitting connection with the drive sheet to slide in a direction away from or towards the rotating shaft. Rotation of the rotating shaft is converted into sliding of the slide rail block. The slide rail block is connected to the housing of the device, and finally, the slide rail block drives the housing of the device to slide in the direction away from or towards the rotating shaft. In this way, during folding of the flexible screen, effective accommodation space can be provided for a bending area of the flexible screen through movement of the rotating shaft connection mechanism. During unfolding of the flexible screen, the flexible screen can be slowly unfolded into a plane through movement of the rotating shaft connection mechanism. Both the cases effectively ensure that a length of the flexible screen remains unchanged, thereby improving user experience.

In addition, a function of driving the drive sheet to slide in the first direction and a function of implementing synchronous rotation of the two rotating shafts are implemented by using the synchronous driving block. On one hand, a relative error between rotation of the rotating shaft and sliding of the drive sheet and the slide rail block can be effectively controlled, thereby improving overall precision of the rotating shaft. On the other hand, if one rotating shaft rotates, the other rotating shaft can be relatively quickly driven to rotate, thereby reducing a stuck problem caused by lagging rotation of the rotating shaft, and improving user experience.

The drive sheet can simultaneously implement sliding of the drive sheet in the first direction and driving the slide rail block to slide in the direction away from or towards the rotating shaft, and tolerance accumulation is small, so that a relative error between rotation and sliding can be relatively well controlled, and resistance during sliding of the slide rail block can be relatively well controlled, thereby improving user experience regarding an operating force.

In one implementation, the at least one rotating shaft connection mechanism includes two rotating shaft connection mechanisms that are respectively disposed at positions close to two end portions of the housing of the device in a first direction, where the first direction is parallel to an axial direction of a rotating shaft in each rotating shaft connection mechanism.

DESCRIPTION OF EMBODIMENTS

The following describes technical solutions of this application with reference to accompanying drawings.

A rotating shaft connection mechanism in the embodiments of this application may be applied to a device with a foldable flexible screen. For example, the device may be a mobile phone, a pad, or a notebook computer.

Figure 1:
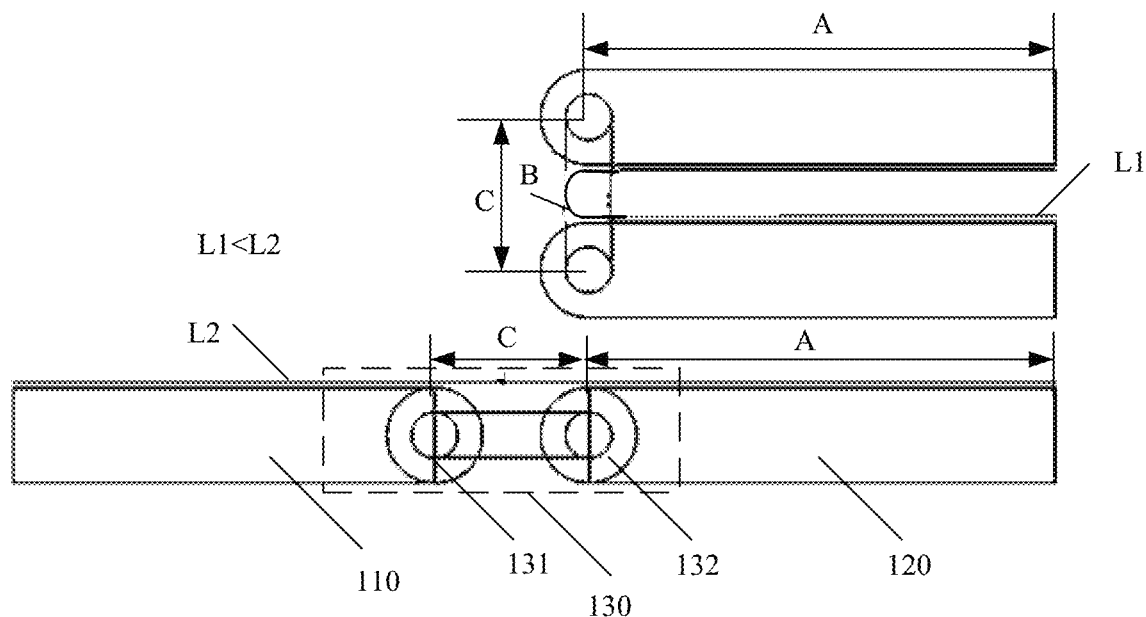
FIG. 1 is a schematic structural diagram of a notebook computer in a folded state and an unfolded state in the prior art.

FIG. 1 is a schematic structural diagram of a notebook computer in the prior art. As shown in FIGS. 1, 110 and 120 are two components of the notebook computer. For example, 110 is a component including a host, 120 is a component including a screen, 130 is a connection mechanism on the notebook computer, 131 is a rotating shaft disposed on the component 110 in the connection mechanism 130, and 132 is a rotating shaft disposed on the component 120 in the connection mechanism 130.

In the first diagram of FIG. 1, the notebook computer is in a folded state, a length A represents a distance between an axis of the rotating shaft and an end portion of the component 110 or the component 120, a length B represents a length of a bending area after folding, and L1=2A+B. In the second diagram of FIG. 1, the notebook computer is in an unfolded state, a length of the unfolded notebook computer is L2, and L2=2A+C, where C is an axial distance between the two rotating shafts.

If a distance between two end portions of the notebook computer is understood as a total length of the flexible screen, L1 is a total length of the flexible screen when the notebook computer is in the folded state, and L2 is a total length of the flexible screen when the notebook computer is in the unfolded state. It is clear that L2 is greater than L1. Therefore, it can be learned that in the folded state of the flexible screen, it cannot be ensured that a length of the flexible screen remains unchanged (that is, L1=L2) during folding or unfolding of the flexible screen. In this way, the flexible screen is damaged. Naturally, the connection mechanism designed based on the folded state cannot ensure that the length of the flexible screen remains unchanged.

Figure 2:
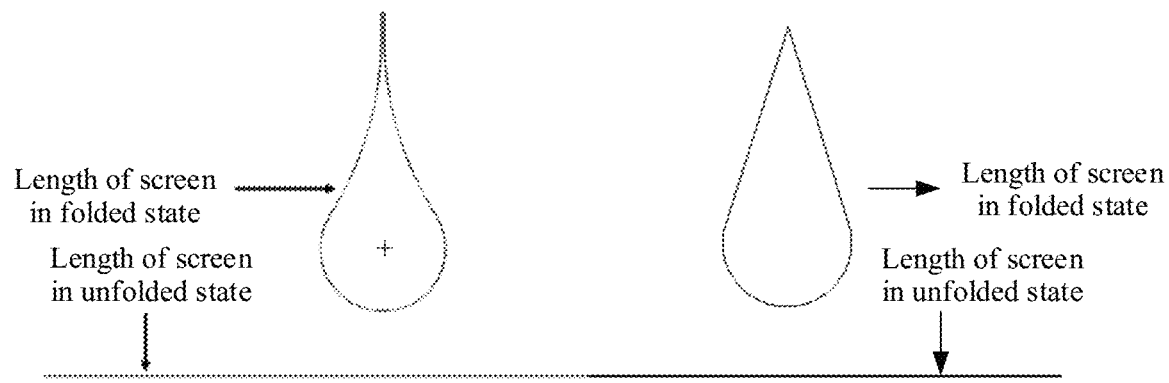
FIG. 2 is a schematic structural diagram of a flexible screen in a folded state and an unfolded state according to an embodiment of this application.

It may be considered that the flexible screen in the folded state may have a relatively large bending area, to avoid damage to the flexible screen as much as possible. In other words, the flexible screen needs to be maintained in a specific folded state, to ensure that the length of the flexible screen remains unchanged. For example, a bending area of the flexible screen in either of two folded states of the flexible screen shown in FIG. 2 is larger than the bending area shown in FIG. 1.

Based on the foregoing folded state of the flexible screen, a rotating shaft connection mechanism needs to be correspondingly designed. During folding of the flexible screen, rotation of the rotating shaft connection mechanism can enable the device to have space that can accommodate the larger bending area. During unfolding of the flexible screen, the flexible screen can be slowly unfolded into a plane through rotation of the rotating shaft connection mechanism, so that the length of the flexible screen remains unchanged regardless of a state of the device.

First, a coordinate system of the accompanying drawings in the embodiments of this application is described. x, y, and z directions are perpendicular to one another. The z direction may be understood as a thickness direction of the rotating shaft connection mechanism (or the device). They direction may be understood as an axial direction of the rotating shaft in the rotating shaft connection mechanism. The x direction is perpendicular to the y direction, and is parallel to a plane in which the flexible screen is in the unfolded state.

Figure 3:
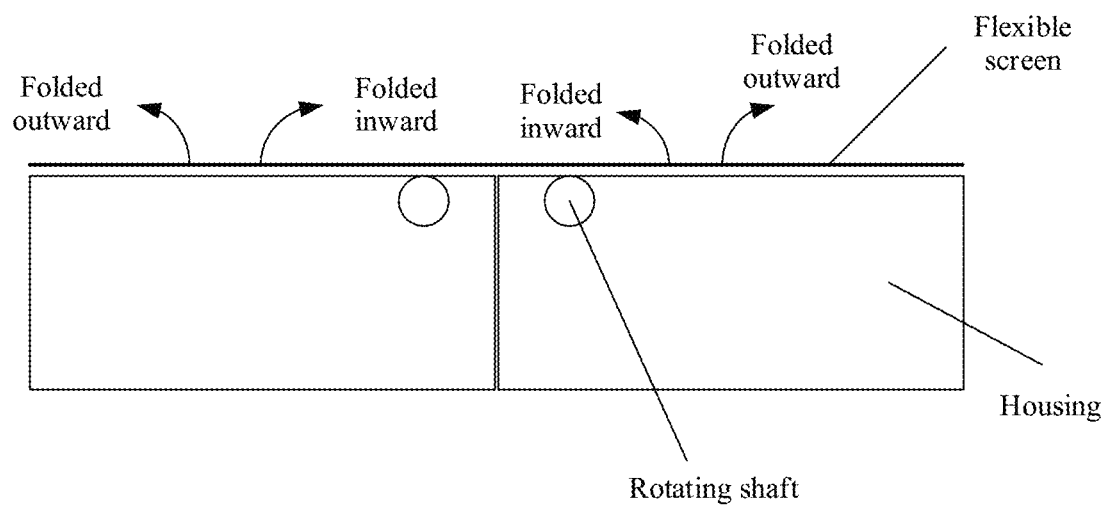
FIG. 3 is a schematic diagram of a folding manner of a flexible screen according to an embodiment of this application.
Figure 4:
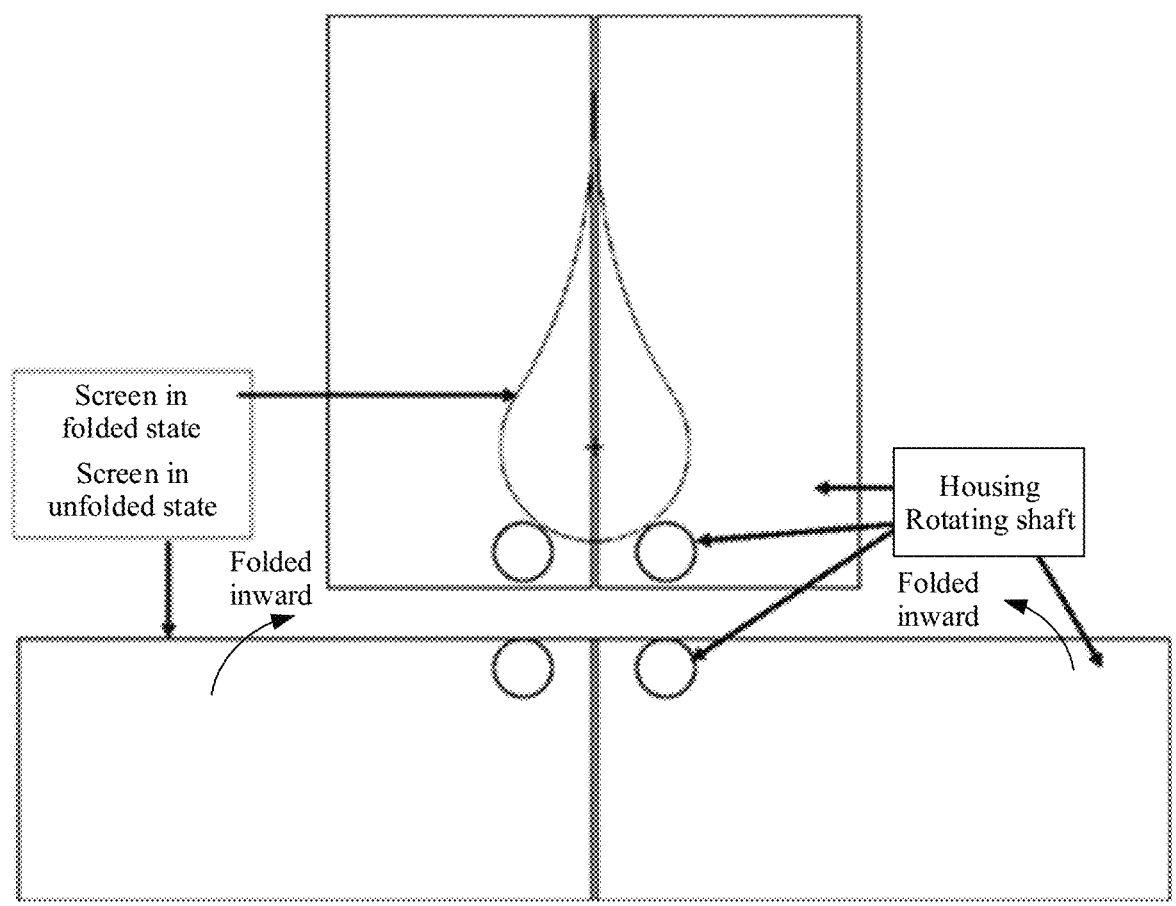
FIG. 4 is another schematic structural diagram of a flexible screen in a folded state and an unfolded state according to an embodiment of this application.

In various embodiments, the flexible screen may have two folding directions. As shown in FIG. 3, one folding manner is folding inward. In this folding manner, a housing of the folded device is wrapped outside the flexible screen, for example, as shown in FIG. 4. The other folding manner is folding outward. In this folding manner, the folded flexible screen is wrapped outside the housing of the device.

When the flexible screen is to be folded inward, to enable the length of the flexible screen to remain unchanged when the flexible screen is folded or unfolded, rotation of the rotating shaft may be converted, by using the rotating shaft connection mechanism, into sliding of the device away from or towards the rotating shaft. For example, when the flexible screen is folded inward from the unfolded state, the rotating shaft in the rotating shaft connection mechanism starts to rotate, and finally drives the housing of the device to slide in a direction away from the rotating shaft, thereby reserving sufficient space for the bending area of the flexible screen. This avoids damage to the flexible screen, and ensures that the length of the flexible screen remains unchanged. Similarly, when the flexible screen starts to be unfolded from the folded state, the rotating shaft in the rotating shaft connection mechanism starts to rotate, and finally drives the housing of the device to slide a direction towards the rotating shaft, to withdraw the space previously reserved for the bending area of the flexible screen and slowly unfold the flexible screen into a plane. This also ensures that the length of the flexible screen remains unchanged.

When the flexible screen is to be folded outward, and the flexible screen starts to be folded from the unfolded state, a sliding direction of the housing of the device is exactly opposite to a sliding direction of the housing when the flexible screen is folded inward. That is, when the flexible screen starts to be folded from the unfolded state, the rotating shaft in the rotating shaft connection mechanism starts to rotate, and finally drives the housing of the device to slide in the direction towards the rotating shaft. When the flexible screen starts to be unfolded from the folded state, the rotating shaft in the rotating shaft connection mechanism starts to rotate, and finally drives the housing of the device to slide in the direction away from the rotating shaft.

The following describes in detail the rotating shaft connection mechanism in the embodiments of this application with reference to FIG. 5 to FIG. 26.

Figure 5:
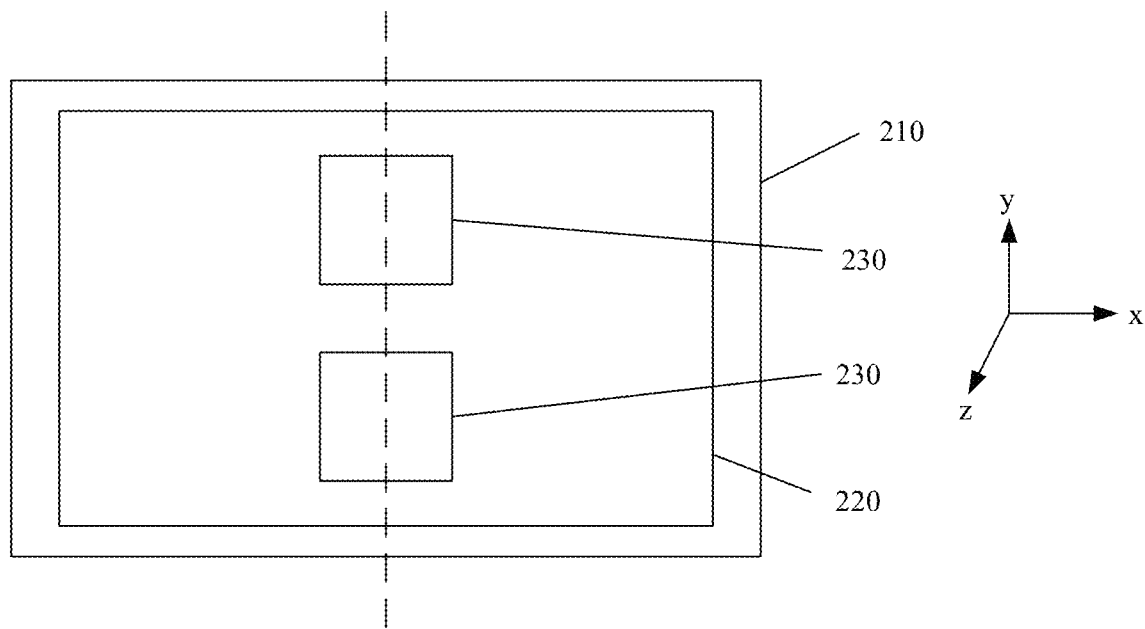
FIG. 5 and FIG. 6 are each a schematic structural diagram of a case in which a foldable device according to an embodiment of this application is disposed.
Figure 6:
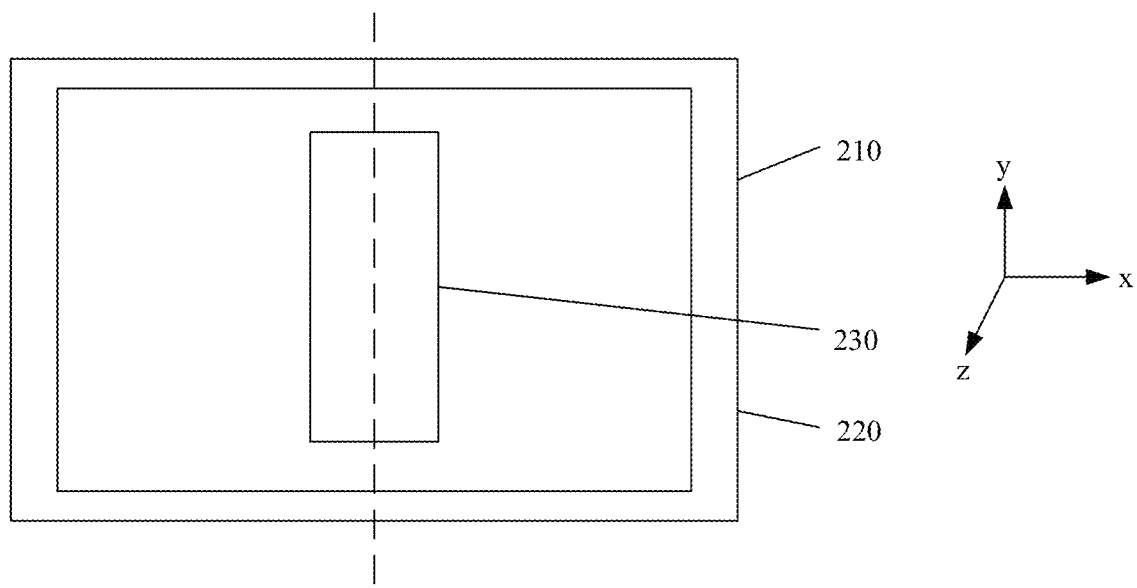

First, a position of the rotating shaft connection mechanism in the device in the embodiments of this application is described by using FIG. 5 and FIG. 6.

In the embodiments of this application, at least one rotating shaft connection mechanism may be disposed in one device.

FIG. 5 is a schematic diagram of a position of a rotating shaft connection mechanism in a device according to an embodiment of this application. FIG. 5 shows two rotating shaft connection mechanisms 230 disposed on the device. Each rotating shaft connection mechanism 230 is disposed under a flexible screen 220. The rotating shaft connection mechanism 230 is connected to a housing 210 of the device. The two rotating shaft connection mechanisms are sequentially arranged in a y direction. In one implementation, the two rotating shaft connection mechanisms are symmetrically arranged along a center line of the device in the y direction.

FIG. 6 is another schematic diagram of a position of a rotating shaft connection mechanism in a device according to an embodiment of this application. FIG. 6 shows a rotating shaft connection mechanism 230 disposed on the device. The rotating shaft connection mechanism 230 may be disposed at a center position of the device or a flexible screen.

It should be understood that the positions of the rotating shaft connection mechanisms shown in FIG. 5 and FIG. 6 on the device are merely examples for description, and shall not constitute any limitation on the embodiments of this application. The positions of the rotating shaft connection mechanisms on the device may be flexibly set based on an actual requirement and a quantity of rotating shaft connection mechanisms.

The following describes in detail a rotating shaft connection mechanism 300 in the embodiments of this application with reference to FIG. 7 to FIG. 26.

It should be understood that, schematic structural diagrams of the rotating shaft connection mechanism and components shown in FIG. 7 to FIG. 25 are all for illustration purposes, and any variant implementation or connection manner falls within the protection scope of the embodiments of this application.

Figure 7:
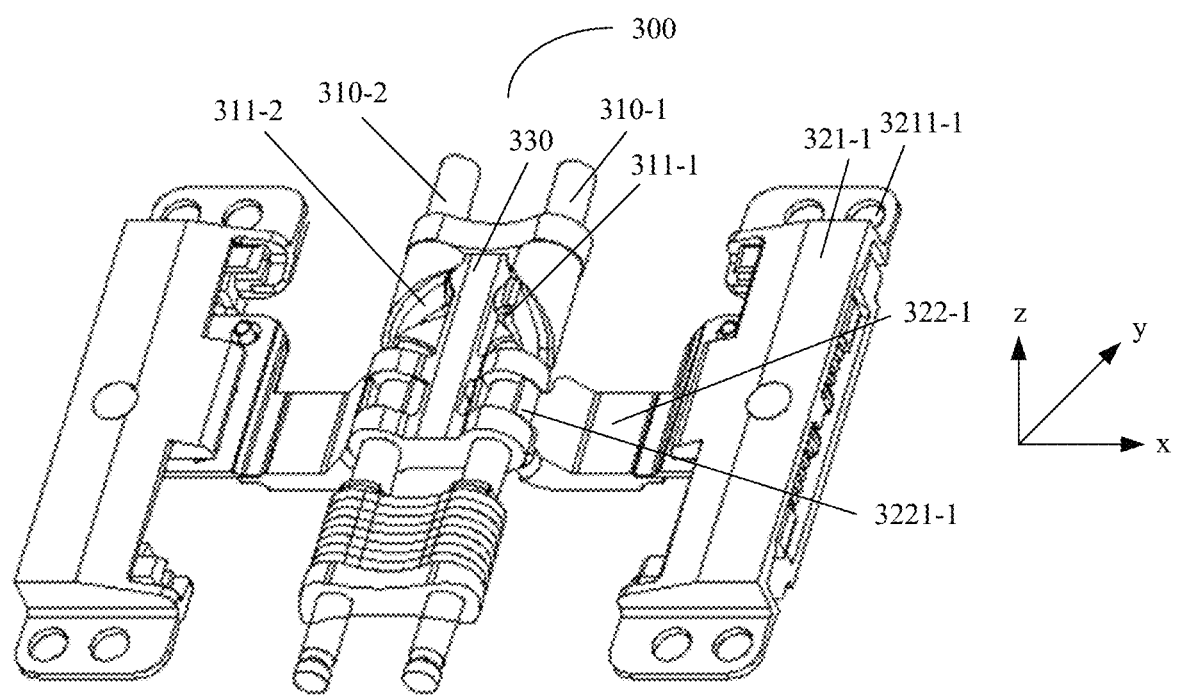
FIG. 7 is a three-dimensional diagram of a rotating shaft connection mechanism in an unfolded state according to an embodiment of this application.

As shown in FIG. 7, the rotating shaft connection mechanism in this embodiment of this application includes two rotating shafts—rotating shaft 310-1 and rotating shaft 310-2; two connection assemblies corresponding to the two rotating shafts, and one synchronous driving block 330 disposed between the two rotating shafts 310. Each of the rotating shafts corresponds to one connection assembly. Each connection assembly includes a slide rail block 321-1 and a drive sheet 322-1.

The following describes each component of the rotating shaft connection mechanism and a connection relationship between the components. In addition, because components in both the connection assemblies are the same, for ease of description and brevity, only a connection assembly on the right of the rotating shaft connection mechanism shown in FIG. 7 is used as an example to describe the components in the connection assembly.

Rotating Shafts 310-1 and 310-2

A spiral groove 311-1 is disposed on the rotating shaft 310-1; and a spiral groove 311-2 is disposed on the rotating shaft 310-2. Because rotation directions of the two rotating shafts are opposite, rotation directions of the spiral grooves 311-1 and 311-2 on the two rotating shafts are opposite.

For example, in FIG. 7, from a perspective along the y direction, when the flexible screen starts to be folded inward from the unfolded state, the rotating shaft 310-1 on the right rotates counterclockwise. Correspondingly, the spiral groove 311-1 of the rotating shaft 310-1 may rotate leftward, the rotating shaft 310-2 on the left rotates clockwise, and the spiral groove 311-2 of the rotating shaft 310-2 on the left rotates rightward.

Slide Rail Block 321-1

As shown in FIG. 7, the slide rail block 321-1 on the right is a component connecting the rotating shaft connection mechanism 300 and the housing of the device. For example, a screw through hole 3211-1 is disposed on the slide rail block 321-1, and the screw through hole 3211-1 on the slide rail block 321-1 may be connected to the housing of the device by using a screw, so that the rotating shaft connection mechanism 300 is connected to the device.

Figure 8:
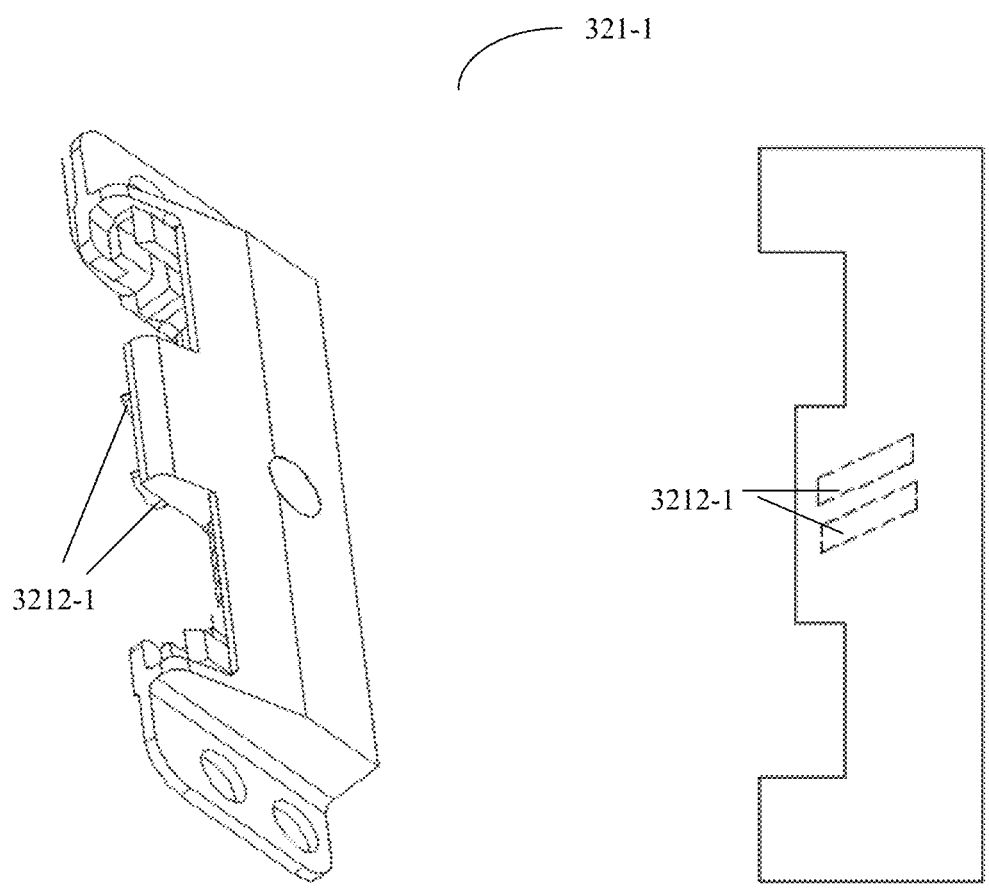
FIG. 8 is a three-dimensional diagram and a top view of a slide rail block according to an embodiment of this application.

FIG. 8 is a schematic structural diagram of the slide rail block 321-1. With reference to FIG. 7 and FIG. 8, the slide rail block 321-1 has a boss 3212-1 protruding towards a drive sheet 322-1 at a position towards the corresponding rotating shaft 310-1. A diagram on the left in FIG. 8 is a three-dimensional diagram of the slide rail block 321-1, and a diagram on the right is a top view corresponding to the slide rail block 321-1 in FIG. 8. There is at least one boss 3212-1. The two bosses in FIG. 7 and FIG. 8 are merely examples for description. In addition, a direction of the boss 3212-1 is related to a rotation direction of the spiral groove 311-1 on the rotating shaft 310-1 and a sliding direction of the housing. Details are to be described in the following.

Drive Sheet 322-1

Figure 9:
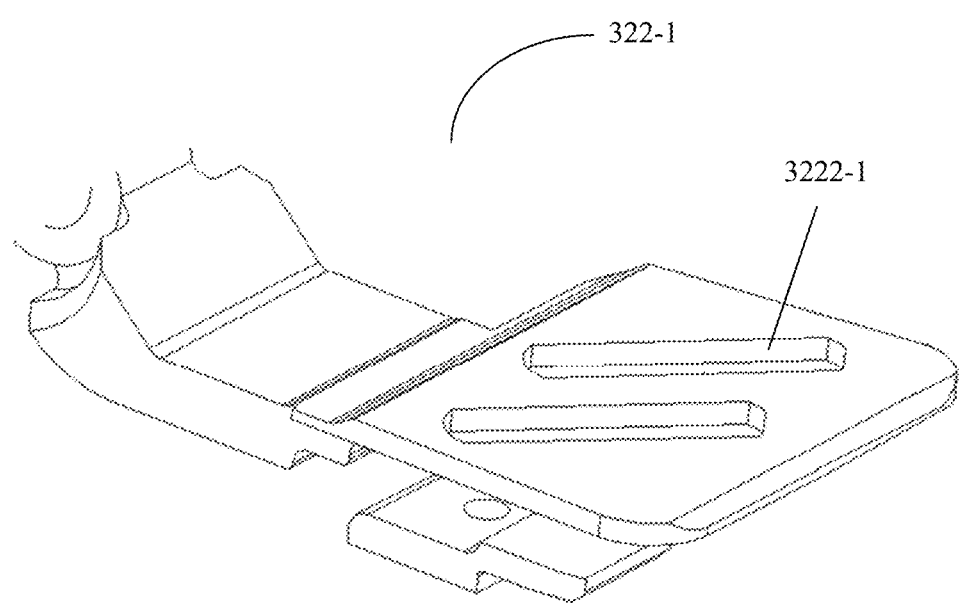
FIG. 9 is a three-dimensional diagram of a drive sheet according to an embodiment of this application.

Still as shown in FIG. 7, the drive sheet 322-1 on the right is disposed between the slide rail block 321-1 and the corresponding rotating shaft 310-1, and is at an end towards the rotating shaft 310-1. In addition, a connecting piece 3221-1 is disposed on a side of the spiral groove 311-1 (that is, under the spiral groove 311-1) of the rotating shaft 310-1 that is away from an end portion of the rotating shaft 310-1. There is at least one connecting piece 3221-1 (FIG. 7 shows one connecting piece 3221-1 as an example). When the drive sheet 322-1 includes a plurality of connecting pieces 3221-1, any two connecting pieces are not in contact with each other, and have a particular distance, to facilitate insertion of the connecting piece on the synchronous driving block 330. With reference to FIG. 9, a slanting groove 3222-1 that can enable the boss 3212-1 of the slide rail block 321-1 to be inserted is disposed at an end away from the rotating shaft 310-1. A quantity of slanting grooves 3222-1 is the same as a quantity of bosses 3212-1 of the slide rail block 321-1 (FIG. 9 shows two slanting grooves as an example). The slanting groove 3222-1 may enable the slide rail block 321-1 to slide in a direction towards the rotating shaft 310-1 or in a direction away from the rotating shaft 310-1. In other words, the slanting groove 3222-1 may enable the slide rail block 321-1 to slide in a width direction of the slide rail block 321-1. A specific principle is to be described in detail subsequently.

Herein, the connecting piece on the drive sheet 322-1 may be a circular ring cylinder shown in FIG. 7, or may be another component that can implement rotatable connection. This is not limited in this embodiment of this application.

In addition, it should be understood that the circular ring cylinder 3221-1 shown in FIG. 7 is merely an example for description, and should not constitute a limitation on this embodiment of this application. For example, although the circular ring cylinder 3221-1 shown in FIG. 7 is not closed in a circumferential direction, actually, the circular ring cylinder 3221-1 may be closed in the circumferential direction, provided that the circular ring cylinder 3221-1 on the drive sheet 322 can be sleeved on the rotating shaft 310-1.

It should be noted that, when the rotating shaft connection mechanism is in the unfolded state, the width direction of the slide rail block 321 is parallel to the x direction, a length direction of the slide rail block 321 is parallel to the y direction, and a thickness direction of the slide rail block 321 is the same as a thickness direction of the housing.

Synchronous Driving Block 330

Still as shown in FIG. 7, the synchronous driving block 330 is disposed between the two rotating shafts 310-1 and 310-2. With reference to a partial enlarged view of a joint between the synchronous driving block 330 and the two rotating shafts 310-1 and 310-2 shown in FIG. 10, in an axial direction of the rotating shaft 310-1 and rotating shaft 310-2, or in they direction, the synchronous driving block 330 is provided with positioning protrusion parts 331-1 and 331-2 that can be inserted into the spiral groove of rotating shafts 310-1 and 310-2 as shown; and a first connecting piece 332 and a second connecting piece 333 sleeved outside each rotating shaft 310. A quantity of first connecting pieces 332-1 and 332-2 are the same as a quantity of second connecting pieces 333-1 and 332-2. In various embodiments, there may be at least one first connecting piece and at least one second connecting piece. In addition, the first connecting piece 332-1 or 332-2 and the second connecting piece 333-1 or 333-2 are located on two sides of the connecting piece 3221 on the drive sheet 322-1, so that the drive sheet 322-1 is driven by the synchronous driving block 330 to slide in a first direction (that is, the y direction).

Figure 10:
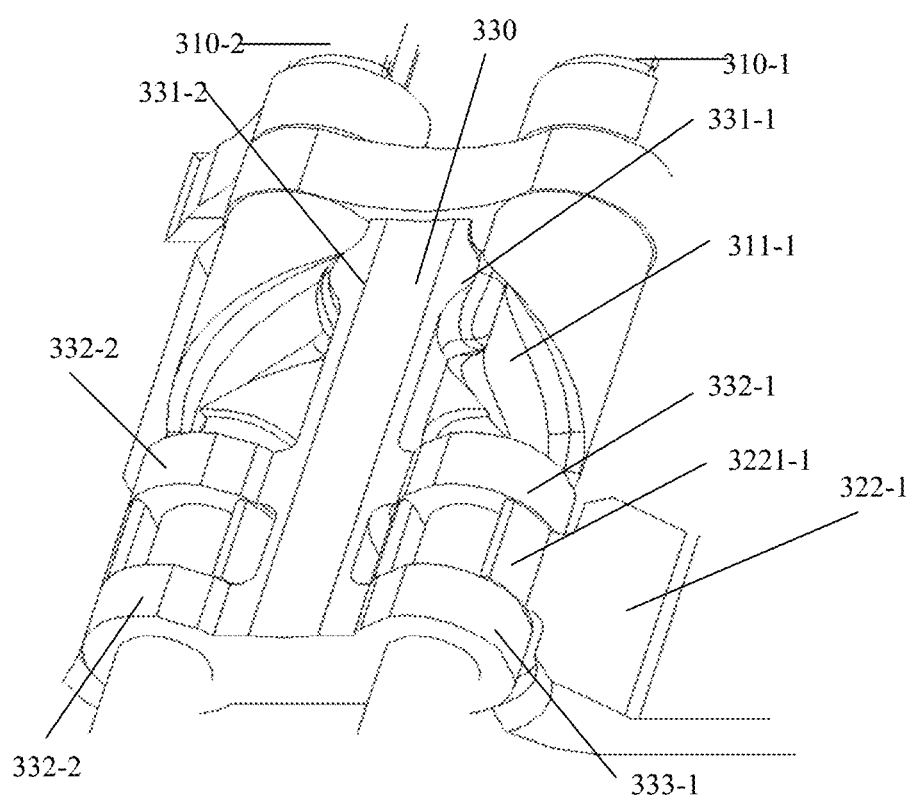
FIG. 10 is a partial three-dimensional diagram of a joint between a rotating shaft and a synchronous driving block according to an embodiment of this application.

The rotating shaft 310-1 on the right and the corresponding drive sheet 322-1 on the right are used as an example. A positioning protrusion part 331-1 inserted into the spiral groove 311-1 is disposed on the synchronous driving block 330. The first connecting pieces (332-1 and 332-2) and the second connecting pieces (333-1 and 333-2) shown in FIG. 10 are disposed under the positioning protrusion parts 331-1 and 331-2. The first connecting piece 332-1 and the second connecting piece 333-1 are disposed on two sides of the connecting piece 3221-1 on the drive sheet 322-1.

Herein, the first connecting piece 332-1 and the second connecting piece 333-1 are located on the two sides of the connecting piece 3221-1 of the drive sheet 322-1, to limit sliding displacement of the drive sheet 322-1 between the first connecting piece 332-1 and the second connecting piece 333-1, and a specific positioning effect is achieved. For example, in FIG. 10, two end faces of the first connecting piece 332-1 and the second connecting piece 333-1 that face the connecting piece 3221-1 of the drive sheet are separately in contact with the connecting piece 3221-1 of the drive sheet. In this way, the sliding displacement of the drive sheet 330-1 between the first connecting piece 332-1 and the second connecting piece 333-1 is approximately 0, and a good positioning effect is achieved.

Herein, the first connecting piece 332 and the second connecting piece 333 of the synchronous driving block 330 may be a circular ring cylinder shown in FIG. 7 and FIG. 10, or may be another component that can implement rotation connection. This is not limited in this embodiment of this application.

Figure 11:
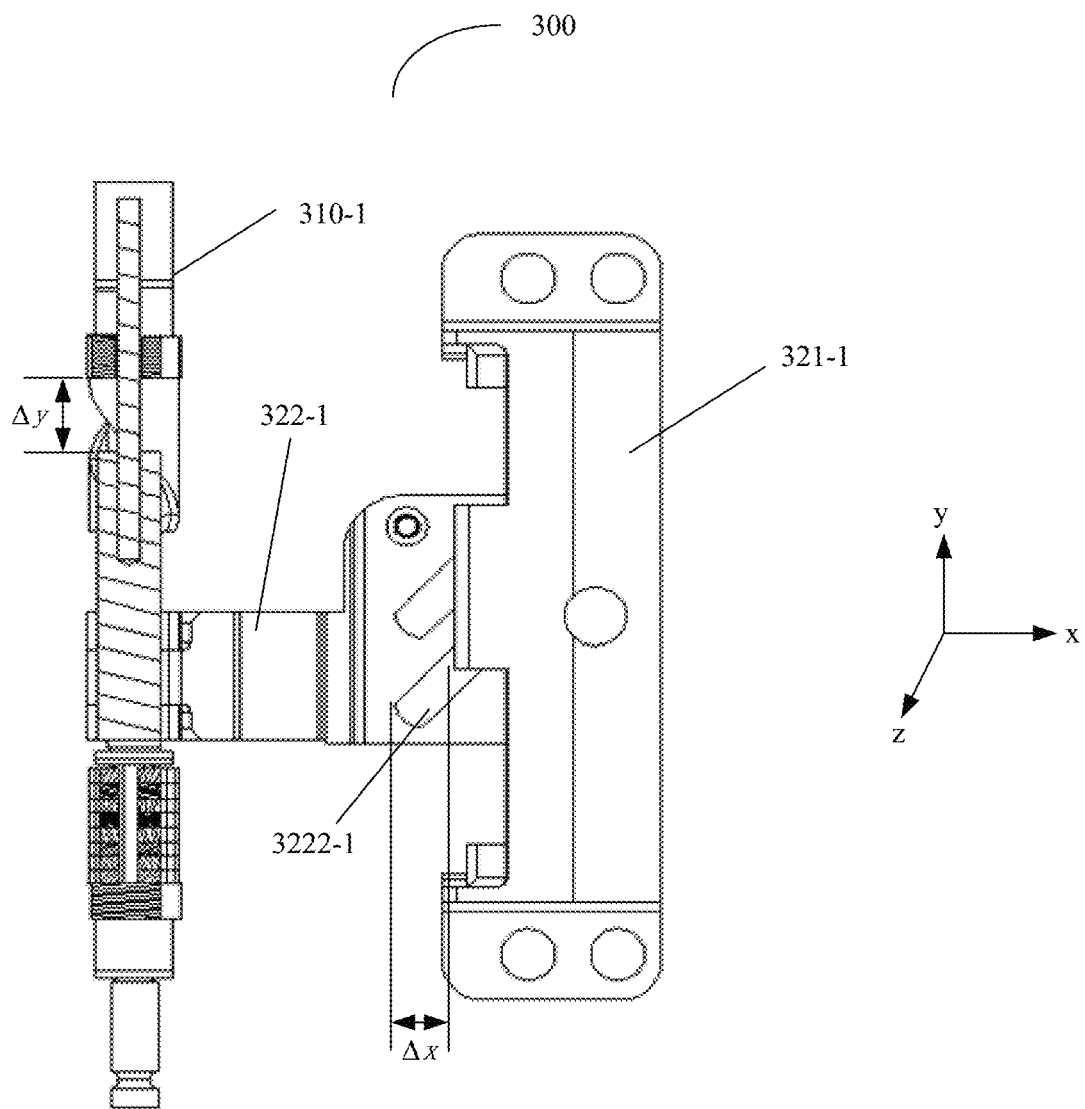
FIG. 11 is a top view of a rotating shaft connection mechanism in a folded state according to an embodiment of this application.

The following describes a working principle of the rotating shaft connection mechanism in the embodiments of this application with reference to the rotating shaft connection mechanism shown in FIG. 7 and FIG. 11.

The rotating shaft 310-1 and/or 31-2 provides a driving force, and drives another component to move based on rotation of the rotating shaft 310. When the rotating shaft connection mechanism is disposed in the device with the flexible screen, when the flexible screen starts to be folded inward from the unfolded state, one rotating shaft (for example, the rotating shaft 310-2) starts to rotate, a positioning protrusion part 331-2 on the synchronous driving block 330 slides on the spiral groove 311-2, and the positioning protrusion part 331-1 corresponding to the rotating shaft 310-1 slides on the spiral groove 311-1, to drive the other rotating shaft (for example, the rotating shaft 310-1) to rotate, to implement a function of synchronizing the two rotating shafts 310 by the synchronous driving block 330. In addition, the positioning protrusion part 331-1 or 333-2 on the synchronous driving block 330 slides on the spiral groove 311-1 or 311-2, so that the synchronous driving block 330 slides in a direction opposite to the y direction. In the connection assembly on the left side of the rotating shaft connection mechanism, the drive sheet 322-1 is connected to the rotating shaft 310-1, and the first connecting piece 332-1 and the second connecting piece 333-1 of the synchronous driving block 330 that are sleeved on the rotating shaft 310-1 are disposed on the two sides of the connecting piece 3221-1 of the drive sheet 332-1. Therefore, when the synchronous driving block 330 slides in the direction opposite to the y direction, the drive sheet 322-1 is driven to also slide in the direction opposite to the y direction. In this way, the drive sheet 322-1 slides in the y direction (that is, the first direction). In addition, because the drive sheet 322-1 is provided with the slanting groove 3222-1, and the boss 3212-1 disposed on the slide rail block 321 fits into the slanting groove 3222-1, naturally, movement of the drive sheet 322-1 drives the slide rail block 310-1 to move. Therefore, when the drive sheet 322-1 slides in the direction opposite to they direction, the slide rail block 310-1 is driven by the slanting groove 3222-1 on the drive sheet 320-1 to move in the direction away from the rotating shaft 310-1. Similarly, the drive sheet 322-1 in the connection assembly on the left of the rotating shaft connection mechanism 300 also slides in the direction opposite to they direction under action of the synchronous driving block 330. In addition, the slanting groove 3222 on the drive sheet 322 on the left also drives the slide rail block 310-1 on the left to slide in a direction away from the rotating shaft 310 on the left. As shown in FIG. 11, when the flexible screen is in the folded state, the rotating shaft connection mechanism shown in FIG. 7 moves to a state shown in FIG. 11. It can be clearly learned that the drive sheet 322-1 slides a distance of $\Delta y$ in the y direction, and the slide rail block 321-1 slides a distance of $\Delta x$ in the direction (for example, the x direction shown in FIG. 11) away from the rotating shaft 310-1.

In this way, when the rotating shaft connection mechanism is disposed on the device, the slide rail block 321-1 is a component connected to the housing of the device. When the slide rail block 321-1 slides in the direction away from the rotating shaft 310-1, the housing also slides in the direction away from the rotating shaft 310-1. In this way, sufficient accommodation space is reserved for a bending area formed after the flexible screen is folded, thereby ensuring that the length of the flexible screen remains unchanged during folding of the flexible screen.

Conversely, in a process in which the flexible screen starts to be unfolded from the folded state, the rotating shaft 310-1 or 310-2 starts to rotate in an opposite direction, and the rotating shaft connection mechanism 300 moves from the state shown in FIG. 11 to a state shown in FIG. 7, so that the length of the flexible screen remains unchanged during unfolding of the flexible screen.

Based on the foregoing descriptions, the rotating shaft connection mechanism 300 provided in this embodiment of this application is provided with the two rotating shafts, the synchronous driving block, and the connection assembly corresponding to each rotating shaft. The connection assembly includes the slide rail block and the drive sheet. The synchronous driving block drives the two rotating shafts to synchronously rotate, drives the drive sheet to slide in the first direction parallel to the axial direction of the rotating shaft, and drives, based on the slanting groove on the drive sheet, the slide rail block in fitting connection with the drive sheet to slide in a direction away from or towards the rotating shaft. Finally, rotation of the rotating shaft is converted into sliding of the slide rail block. When the rotating shaft connection mechanism is disposed on the device with the flexible screen, the slide rail block is connected to the housing of the device, and finally drives the housing of the device to slide in the direction away from or towards the rotating shaft. In this way, during folding of the flexible screen, effective accommodation space can be provided for the bending area of the flexible screen through movement of the rotating shaft connection mechanism. During unfolding of the flexible screen, the flexible screen can be slowly unfolded into a plane through movement of the rotating shaft connection mechanism. Both the cases effectively ensure that the length of the flexible screen remains unchanged, thereby improving user experience.

In addition, a function of driving the drive sheet to slide in the first direction and a function of implementing synchronous rotation of the two rotating shafts are implemented by using the synchronous driving block. On one hand, a relative error between rotation of the rotating shaft and sliding of the drive sheet and the slide rail block can be effectively controlled, thereby improving overall precision of the rotating shaft. On the other hand, if one rotating shaft rotates, the other rotating shaft can be relatively quickly driven to rotate, thereby reducing a stuck problem caused by lagging rotation of the rotating shaft, and improving user experience.

The drive sheet can simultaneously implement sliding of the drive sheet in the first direction and driving the slide rail block to slide in the direction away from or towards the rotating shaft, and tolerance accumulation is small, so that a relative error between rotation and sliding can be relatively well controlled, and resistance during sliding of the slide rail block can be relatively well controlled, thereby improving user experience regarding an operating force.

As described above, the flexible screen may be folded inward, or may be folded outward. When the rotating shaft connection mechanism in this embodiment of this application is disposed on the device with the flexible screen, the spiral groove on the rotating shaft, the slanting groove on the drive sheet, and the boss that is inserted into the slanting groove on the slide rail block are designed differently.

With reference to FIG. 12 to FIG. 15, the following separately describes in detail, based on the foregoing two manners, the spiral groove on the rotating shaft, the slanting groove on the drive sheet, and the boss that is inserted into the slanting groove on the slide rail block.

In addition, because the rotating shafts, the drive sheets, and the slide rail blocks of the rotating shaft connection mechanism are symmetrically disposed, for brevity, only the rotating shaft, the drive sheet, and the slide rail block on the right side of the rotating shaft connection mechanism shown in FIG. 7 or FIG. 11 are used for description.

The flexible screen is folded inward from the unfolded state.

In this case, during folding of the flexible screen, the rotating shaft needs to drive the sliding block to slide in the direction away from the rotating shaft. During unfolding of the flexible screen, the rotating shaft needs to drive the sliding block to slide in the direction towards the rotating shaft. Therefore, to achieve the foregoing objective, the rotation direction of the spiral groove on the rotating shaft should be opposite to a direction of the slanting groove of the drive sheet on the corresponding connection assembly.

Figure 12:
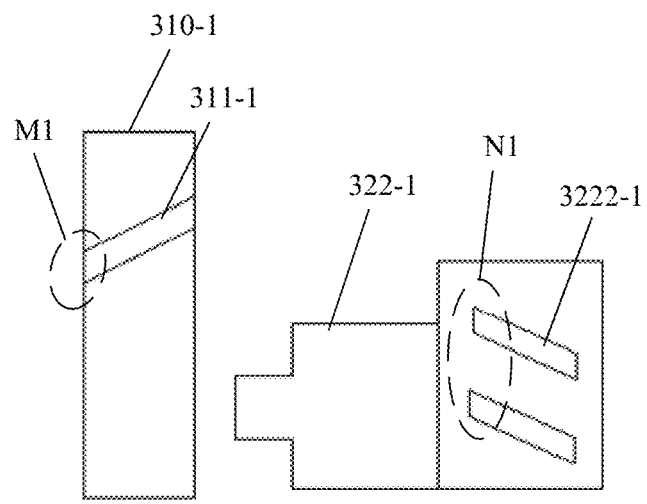
FIG. 12 to FIG. 15 are each a schematic structural diagram of a rotation direction of a spiral groove of a rotating shaft and a direction of a slanting groove of a drive sheet according to an embodiment of this application.
Figure 13:
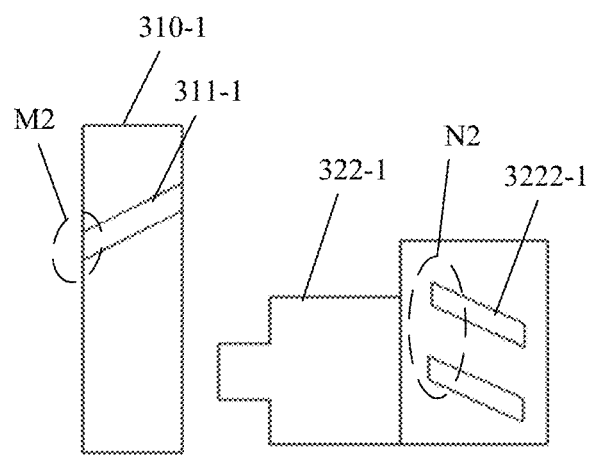

FIG. 12 and FIG. 13 are each a schematic structural diagram showing that a rotation direction of a spiral groove of a rotating shaft is opposite to a direction of a slanting groove of a drive sheet according to an embodiment of this application.

In FIG. 12, the spiral groove 311-1 rotates leftward, and a direction of the slanting groove 3222-1 is opposite to a direction of the spiral groove 311-1. That is, the direction of the slanting groove 3222-1 is upper right. In this case, a direction of the boss 321-1 of the slide rail block 321-1 is unique, and corresponds to the direction of the slanting groove 3222-1. In this case, when the flexible screen is in the unfolded state, or when the rotating shaft connection mechanism is in the unfolded state, a start position of the positioning protrusion part 331-1 of the synchronous driving block 330 is at a position shown by M1. A start position of the boss 321-1 of the slide rail block 321-1 is at a position shown by N1.

Correspondingly, the spiral groove of the rotating shaft on the left symmetrically disposed with the rotating shaft 310-1 in FIG. 12 rotates rightward, and a corresponding direction of a slanting groove on the drive sheet is upper left, not shown in the figure.

In FIG. 13, the spiral groove 311-1 rotates rightward, and the direction of the slanting groove 3222-1 is opposite to the direction of the spiral groove 311-1. That is, the direction of the slanting groove 3222-1 is lower right. In this case, the direction of the boss 321-1 of the slide rail block 321-1 corresponds to the direction of the slanting groove 3222-1. In this case, when the flexible screen is in the unfolded state, or when the rotating shaft connection mechanism 300 is in the unfolded state, the start position of the positioning protrusion part 331-1 of the synchronous driving block 330 is at a position shown by M2. The start position of the boss 321-1 of the slide rail block 321-1 is at a position shown by N2.

Correspondingly, the spiral groove of the rotating shaft on the left symmetrically disposed with the rotating shaft 310-1 in FIG. 13 rotates leftward, and the corresponding direction of the slanting groove on the drive sheet is lower left, not shown in the figure.

The flexible screen is folded inward from the unfolded state.

In this case, during folding of the flexible screen, the rotating shaft needs to rotate to drive the slide rail block to slide in the direction towards the rotating shaft. During unfolding of the flexible screen, the rotating shaft needs to drive the sliding block to slide in the direction away from the rotating shaft. Therefore, to achieve the foregoing objective, the rotation direction of the spiral groove on the rotating shaft should be the same as the corresponding direction of the slanting groove of the drive sheet.

Figure 14:
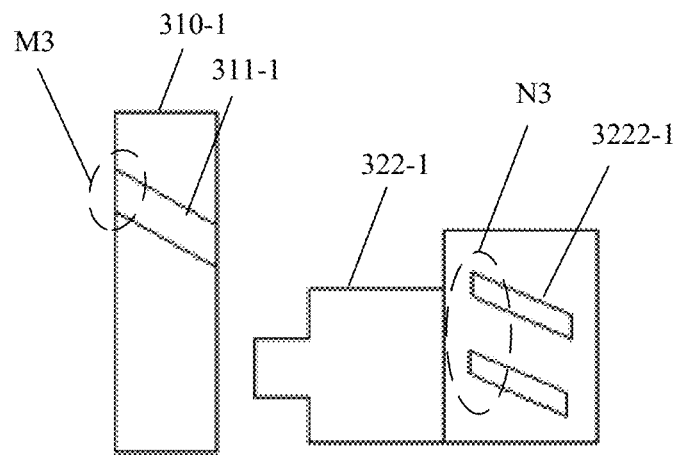
Figure 15:
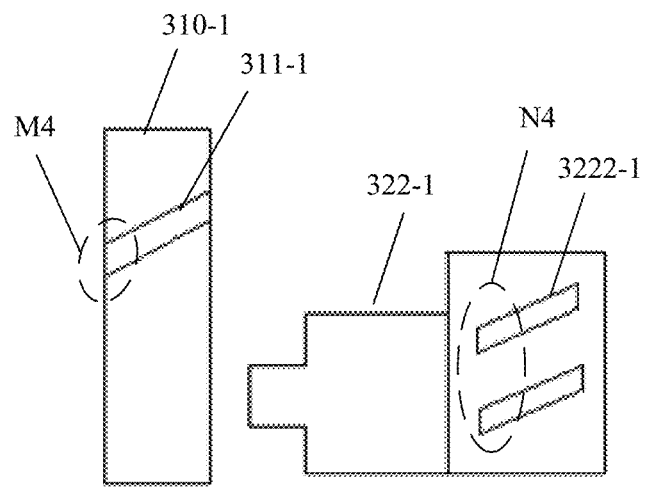

FIG. 14 and FIG. 15 are each a schematic structural diagram showing that a rotation direction of a spiral groove of a rotating shaft is the same as a direction of a slanting groove of a drive sheet according to an embodiment of this application.

In FIG. 14, the spiral groove 311-1 rotates leftward, and a direction of the slanting groove 3222-1 is the same as a direction of the spiral groove 311-1. That is, the direction of the slanting groove 3222-1 is lower right. In this case, a direction of the boss 321-1 of the slide rail block 321-1 is unique, and corresponds to the direction of the slanting groove 3222-1. In this case, when the flexible screen is in the unfolded state, or when the rotating shaft connection mechanism is in the unfolded state, a start position of the positioning protrusion part 331-1 of the synchronous driving block 330 is at a position shown by M3. A start position of the boss 321-1 of the slide rail block 321-1 is at a position shown by N3.

Correspondingly, the spiral groove of the rotating shaft on the left symmetrically disposed with the rotating shaft 310-1 in FIG. 14 rotates rightward, and the corresponding direction of the slanting groove on the drive sheet is lower left, not shown in the figure.

In FIG. 15, the spiral groove 311-1 rotates rightward, and the direction of the slanting groove 3222-1 is the same as the direction of the spiral groove 311-1. That is, the direction of the slanting groove 3222-1 is upper right. In this case, the direction of the boss 321-1 of the slide rail block 321-1 corresponds to the direction of the slanting groove 3222-1. In this case, when the flexible screen is in the unfolded state, or when the rotating shaft connection mechanism 300 is in the unfolded state, the start position of the positioning protrusion part 331-1 of the synchronous driving block 330 is at a position shown by M2. The start position of the boss 321-1 of the slide rail block 321-1 is at a position shown by N2.

Correspondingly, the spiral groove of the rotating shaft on the left symmetrically disposed with the rotating shaft 310-1 in FIG. 15 rotates leftward, and a corresponding direction of a slanting groove on the drive sheet is upper left, not shown in the figure.

As can be learned from a principle of the rotating shaft connection mechanism described above, an angle formed between the direction of the slanting groove 3222 on the drive sheet 322-1 and a length direction of the drive sheet 322-1 (or the width direction of the slide rail block 321-1) is related to an amount of movement of the drive sheet 322-1 in the y direction and an amount of movement of the slide rail block 321-1 towards a direction towards or away from the corresponding rotating shaft 310-1. The length direction of the drive sheet 322-1 is perpendicular to an axial direction of the corresponding rotating shaft 310-1, and when the rotating shaft connection mechanism is disposed on the device, the length direction of the drive sheet 322-1 is perpendicular to a thickness direction of the device. When the rotating shaft connection mechanism 300 is in the unfolded state, the length direction of the drive sheet 322-1 is the x direction shown in FIG. 7.

Actually, during determining of the angle between the direction of the slanting groove 3222-1 and the length direction of the drive sheet 322-1, an amount of movement of the slide rail block 321-1 in the direction towards or away from the corresponding rotating shaft 310-1 may be understood as an amount of movement of the slide rail block 321-1 in the width direction (or the length direction of the drive sheet 322-1) of the slide rail block 321-1.

In an actual design, the amount of movement of the slide rail block 321-1 in the width direction of the slide rail block 321-1 is determined, and an angle between the direction of the slanting groove 3222-1 and the direction of the drive sheet 322-1 may be preliminarily determined, and then the amount of movement of the drive sheet 322-1 in they direction is determined based on the angle and the amount of movement of the slide rail block 321-1 in the width direction of the slide rail block 321-1. Subsequently, the angle is adjusted for a plurality of times until a final angle is determined.

In one implementation, the angle is 45°.

For ease of description of a subsequent solution, the following describes the subsequent solution by using the rotation direction of the spiral groove and the direction of the slanting groove shown in FIG. 12 as an example.

In accordance with the disclosure, one objective is to convert rotation of the rotating shaft into movement of the slide rail block in a direction towards the rotating shaft or away from the rotating shaft. To effectively ensure that in a process in which the slide rail block moves relative to the rotating shaft, the slide rail block moves in a straight line in only one direction (that is, the width direction of the slide rail block) as much as possible, in this embodiment of this application, for example, in the rotating shaft connection mechanism shown in FIG. 7, a sliding sheet 323-1 located between the slide rail block 321-1 and the corresponding rotating shaft 310-1 is further disposed. A width direction of the sliding sheet 323-1 is perpendicular to the axial direction of the rotating shaft 310-1. In addition, when the rotating shaft connection mechanism is disposed on the device, the width direction of the sliding sheet 323-1 is perpendicular to the thickness direction of the device. When the rotating shaft connection mechanism is in the unfolded state, the width direction of the slide rail block 321-1 is the x direction shown in FIG. 16. In addition, the width direction of the sliding sheet 323-1 is the same as the length direction of the drive sheet 322-1.

Referring to FIG. 16, FIG. 17, FIG. 18, and FIG. 19, still only the connection assembly on the right is used for description.

Figure 16:
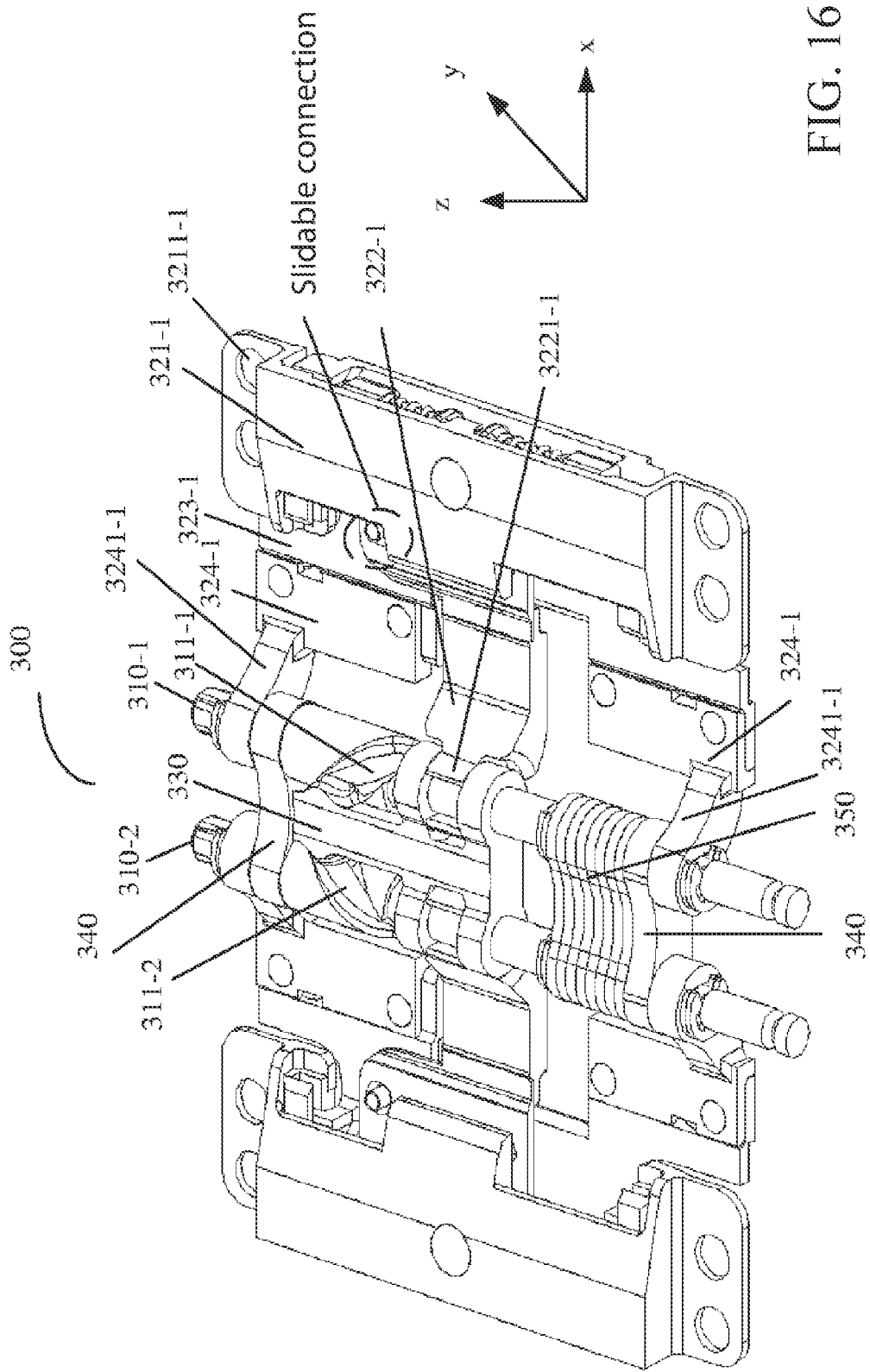
FIG. 16 is another three-dimensional diagram of a rotating shaft connection mechanism in an unfolded state according to an embodiment of this application.
Figure 17:
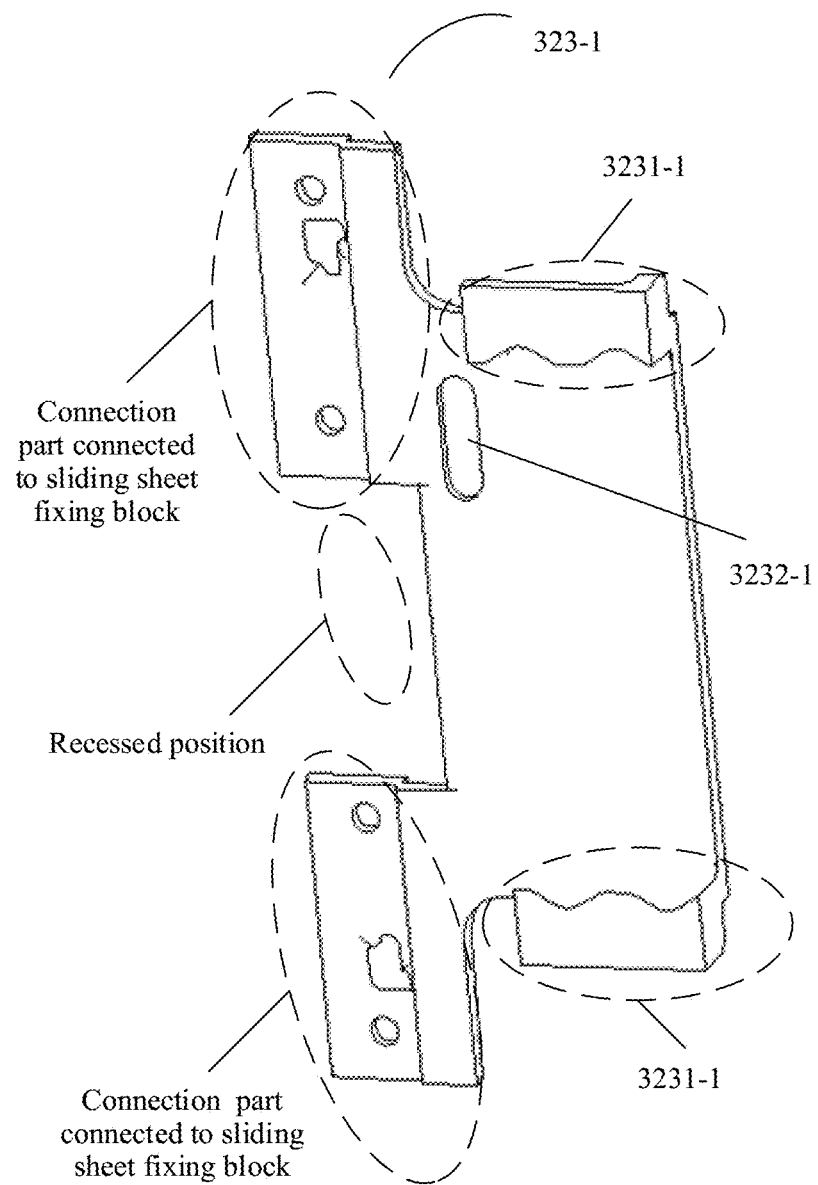
FIG. 17 is a three-dimensional diagram of a sliding sheet according to an embodiment of this application.
Figure 18:
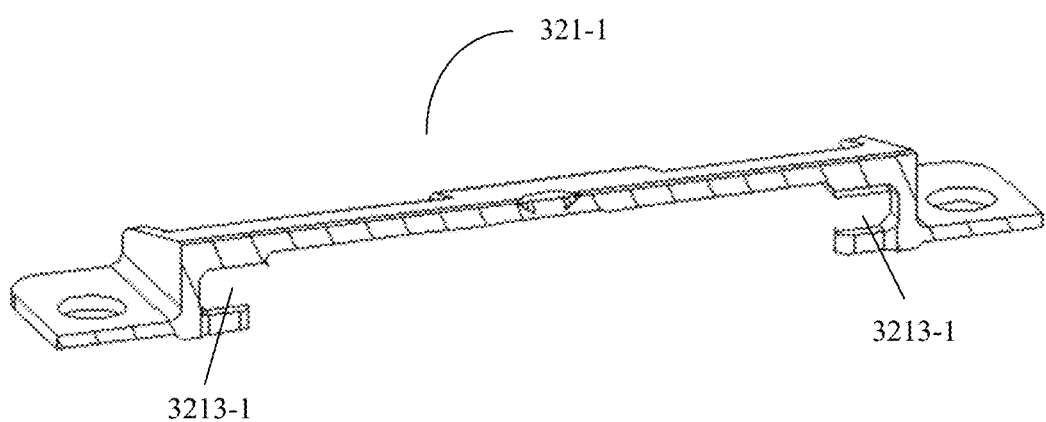
FIG. 18 is a partial three-dimensional diagram of a slide rail block according to an embodiment of this application.

As shown in FIG. 16, the sliding sheet 323-1 of the connection assembly on the right is disposed between the slide rail block 321-1 and the rotating shaft 310-1. In addition, as shown in FIG. 17, two protruding end portions 3231-1 are disposed on the sliding sheet 321-1. Correspondingly, as shown in FIG. 18, two grooves 3213-1 whose openings face opposite directions are also disposed at positions of two end portions of the slide rail block 321-1. The two grooves 3213-1 on the slide rail block 321-1 correspond to the two protruding end portions 3231-1 on the sliding sheet 323-1. Each protruding end portion 3231-1 is inserted into a corresponding groove 3213-1. When the connection assembly includes the sliding sheet 323-1, the drive sheet 322-1 may be disposed between the sliding sheet 323-1 and the rotating shaft 310-1. For example, referring to FIG. 16 and FIG. 17, the sliding sheet 323-1 is recessed inward at a position towards the rotating shaft 310-1 to accommodate the drive sheet 322-1. In addition, as shown in FIG. 16 and FIG. 17, the drive sheet 322 is slidably connected to the sliding sheet 323. For example, a dowel passing through the drive sheet 322-1 may be connected to a slot 3232-1 on the sliding sheet 323-1, so that the drive sheet 322-1 is slidably connected to the sliding sheet 323-1. When the flexible screen is folded inward from the unfolded state shown in FIG. 16 to the folded state shown in FIG. 19, the drive sheet 322-1 moves along the direction opposite to they direction through the slidable connection to the sliding sheet 323-1.

In this embodiment of this application, the sliding sheet 323-1 is rotatably connected to the rotating shaft 310-1.

In an implementation, the sliding sheet 323-1 may be directly connected to the rotating shaft 310-1. For example, a circular ring cylinder sleeved on the rotating shaft 310-1 may be disposed on the sliding sheet 323-1, so that the sliding sheet 323-1 is rotatably connected to the rotating shaft 310-1.

In another implementation, the sliding sheet 323-1 may alternatively be connected to the rotating shaft 310-1 by using another component.

That is, the connection assembly further includes at least one sliding sheet fixing block 324-1 or 324-2, which is disposed between the corresponding rotating shaft 310-1 or 310-1 and the sliding sheet 313-1 or 313-1, and each sliding sheet fixing block (e.g., 324-1 or 324-2) is rotatably connected to the corresponding rotating shaft 310-1 or 310-2 and is fixedly connected to the sliding sheet 323-1 or 323-2. The sliding sheet fixing block 324-1 or 324-2 may be rotatably connected to the corresponding rotating shaft 310 by using a connecting piece disposed on the sliding sheet fixing block 324-1 or 324-2, and is fixedly connected to the sliding sheet 323-1 or 323-2 in a manner such as welding, splicing, or screwing.

Figure 20:
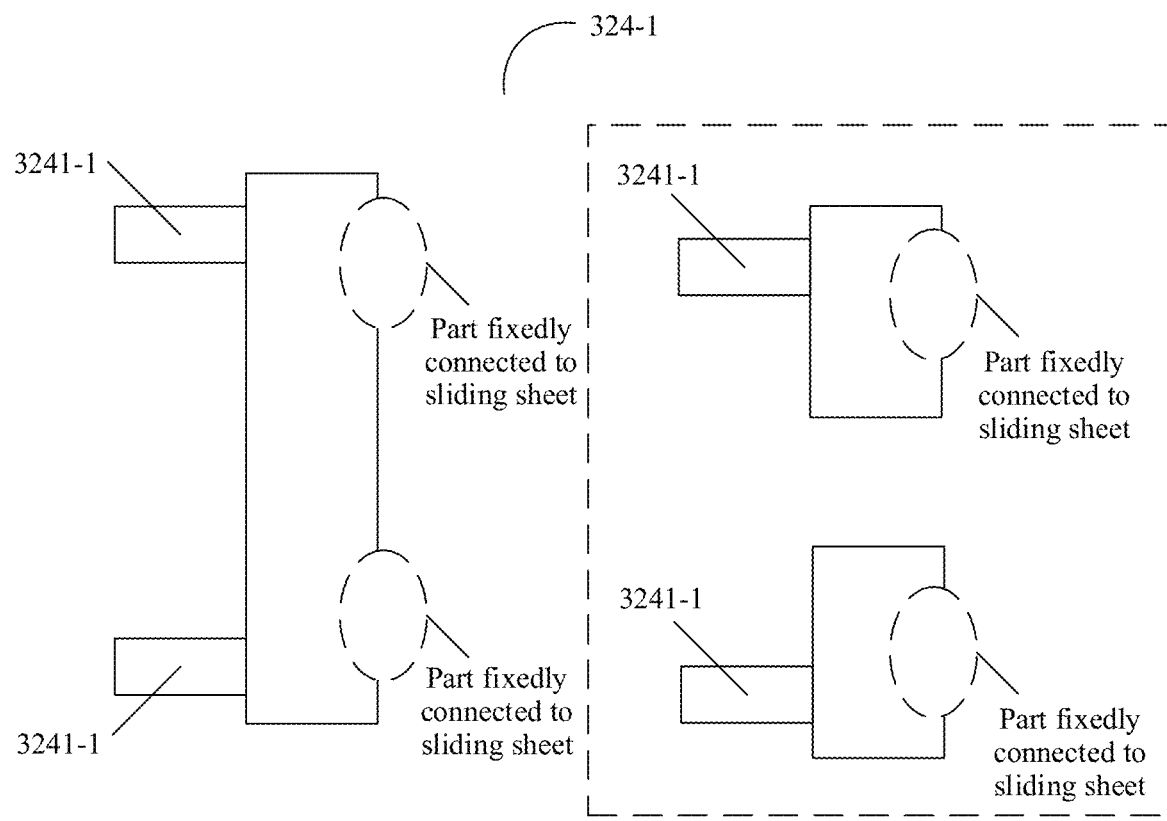
FIG. 20 is a top view of a sliding sheet fixing block according to an embodiment of this application.

Referring to FIG. 20, the connection assembly on the right is still used as an example for description.

A figure on the left of FIG. 20 shows a sliding sheet fixing block 324-1 disposed on the rotating shaft connection mechanism, including two connecting pieces 3241-1 sleeved on the rotating shaft 310-1, and on the other end of the sliding sheet fixing block 324-1, the two connecting pieces 3241-1 may be fixedly connected to the sliding sheet 323-1 in two positions shown in FIG. 20. Certainly, the connection manner shown in FIG. 20 is merely an example for description, and various variant connection manners fall within the protection scope of this embodiment of this application.

With reference to FIG. 16, a figure on the right of FIG. 20 shows two sliding sheet fixing blocks 324-1 disposed on the rotating shaft connection mechanism. Each sliding sheet fixing block 341-1 includes a connecting piece 3241-1 sleeved on the rotating shaft 310-1, and the other end is fixedly connected to the sliding sheet 323-1.

Because the rotating shaft connection mechanism is disposed on the device, theoretically, it is better to occupy less space of the device. Therefore, the rotating shaft may be made smaller, but strength of the rotating shaft needs to be ensured. Therefore, to maintain the strength of the rotating shaft when a size of the rotating shaft is smaller, the rotating shaft may be designed as a variable-diameter shaft.

Figure 21:
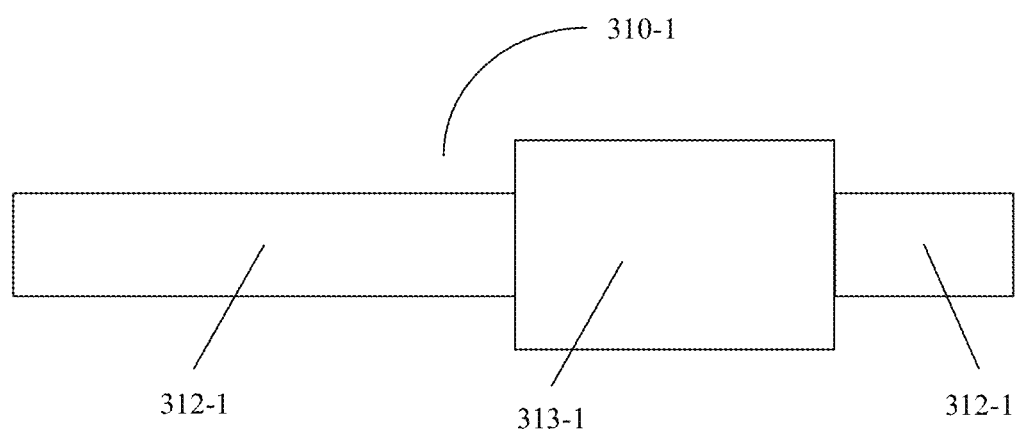
FIG. 21 is a top view of a rotating shaft according to an embodiment of this application.

FIG. 21 is a schematic structural diagram of a variable-diameter shaft according to an embodiment of this application.

As shown in FIG. 21, a radius of a middle part (that is, a part 313-1) of the variable-diameter shaft is large, and a radius of each of two end portions (that is, a part 312-1) is small. In this embodiment of this application, a part with a relatively large radius may be a part provided with a spiral groove.

In this case, the connecting piece 3241 on the sliding sheet fixing block 324-1 may be rotatably connected to a part with a relatively small radius of the corresponding rotating shaft 310-1. In addition, when the rotating shaft 310-1 is a variable-diameter shaft, it is simple and practical to connect the sliding sheet 323-1 and the rotating shaft 310-1 by using the sliding sheet fixing block 324.

That is, in one implementation, the rotating shaft 310-1 of the connection assembly is a variable-diameter shaft, each sliding sheet fixing block 324-1 is rotatably connected to a first part 312 of the rotating shaft 310-1 of the corresponding connection assembly, and a radius of the first part 312 is less than a radius of a part 313 provided with a spiral groove in the rotating shaft 310 corresponding to the connection assembly.

The following uses an example in which one connection assembly includes two sliding sheet fixing blocks 324-1 and 324-2. Still referring to FIG. 16 and FIG. 19, a connection assembly on the right is used as an example for description.

Figure 19:
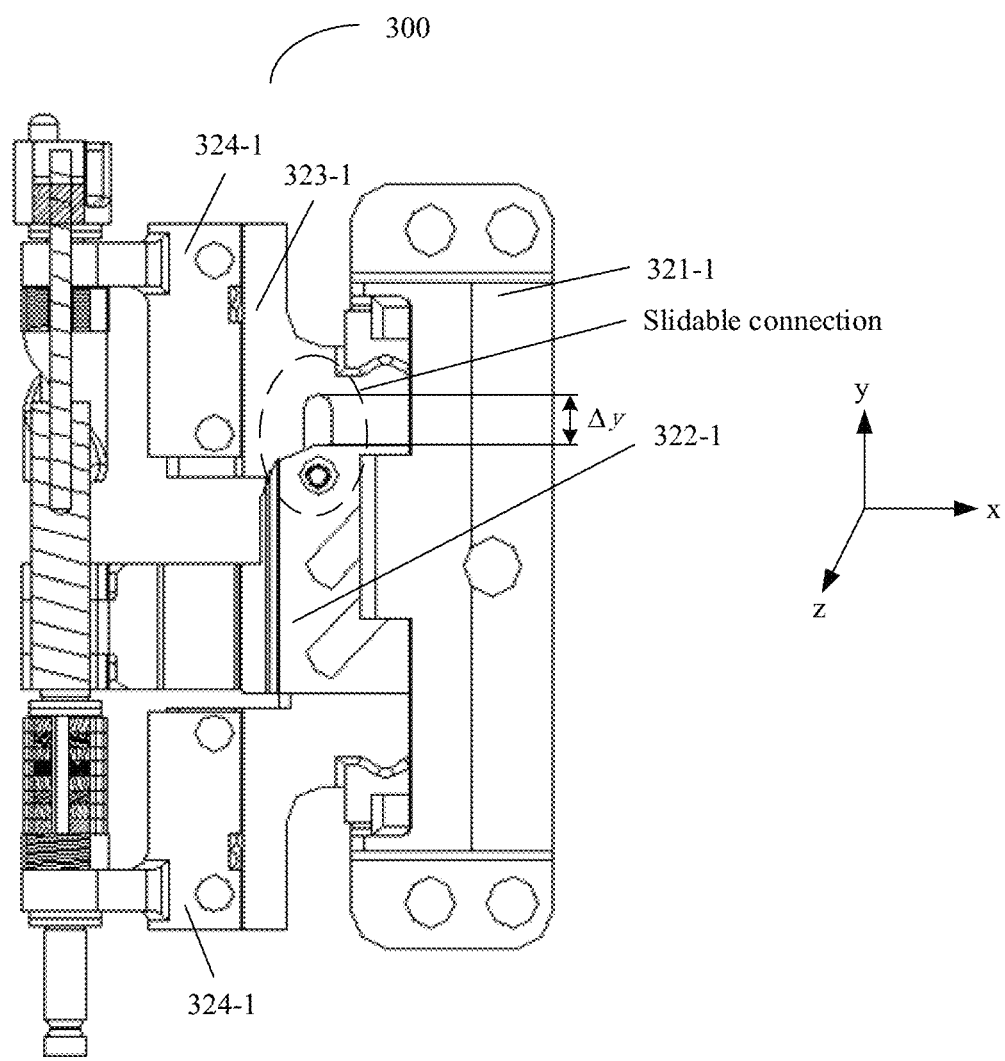
FIG. 19 is a top view of a rotating shaft connection mechanism in an unfolded state according to an embodiment of this application.

As shown in FIG. 16 and FIG. 19, two sliding sheet fixing blocks 324-1 are disposed at positions close to two end portions of the rotating shaft 310-1 in they direction, and each sliding sheet fixing block 324-1 is disposed between the sliding sheet 321-1 and the rotating shaft 310-1. One end of the sliding sheet fixing block 324-1 is rotatably connected to the rotating shaft 310-1. For example, a rotatable connection may be implemented by sleeving a connecting piece disposed on the sliding sheet fixing block 324-1 on the rotating shaft 310-1. Herein, the sliding sheet fixing block 324-1 is rotatably connected to the first part 312-1 of the rotating shaft 310-1, referring to FIG. 21.

The other end of the sliding sheet fixing block 324-1 is fixedly connected to the sliding sheet 323-1. For example, as shown in FIG. 17, two protruding parts (referred to as connection parts) of the sliding sheet 323-1 are connection parts fixedly connected to the two sliding sheet fixing blocks 324-1 respectively, and each connection part is connected to one end of one sliding sheet fixing block 324-1. The sliding sheet fastening block 324-1 may be fixedly connected to the sliding sheet 323-1 in a manner such as welding, splicing, or screwing.

Herein, the connecting piece on the sliding sheet fastening block 324-1 may be a circular ring cylinder shown in FIG. 16 and FIG. 19, or may be another component that can implement a rotatable connection. This is not limited in this embodiment of this application.

During synchronous rotation of the two rotating shafts of the rotating shaft connection mechanism 300, a distance between the two rotating shafts needs to maintain unchanged as much as possible. Therefore, based on this consideration, still referring to FIG. 16, the rotating shaft connection mechanism in this embodiment of this application may further include a dual-shaft fixing block 340 that is rotatably connected to the two rotating shafts 310. Usually, a dual-shaft fixing block 340 is disposed at a position towards an end portion of the rotating shaft 310.

There may be one or more dual-shaft fixing blocks 340. This is not limited in this embodiment of this application. If there is one dual-shaft fixing block 340, the dual-shaft fixing block 340 may be disposed at any end portion of the rotating shaft 310-1 or 310-2. If there is a plurality of dual-shaft fixing blocks 340, two of the plurality of dual-shaft fixing blocks 340 may be disposed at two end portions towards the rotating shaft 310-1 and 310-2, and the remaining may be disposed at a middle position. FIG. 16 shows two dual-shaft fixing blocks disposed towards end portions of the rotating shaft 310.

In one implementation, still as shown in FIG. 16, the rotating shaft connection mechanism in this embodiment of this application further includes a damping sheet 350 disposed at an end portion of each of the two rotating shafts 310 (namely, the rotating shaft 310-1 and the rotating shaft 310-2). Two connecting pieces (for example, two circular ring cylinders) corresponding to the two rotating shafts 310 are disposed on the damping sheet 350, and each connecting piece on the damping sheet 350 is in interference fit with the corresponding rotating shaft 310.

When the rotating shaft connection mechanism includes the dual-shaft fixing block 340, the damping sheet 350 may be disposed on a side of the dual-shaft fixing block 340 away from an end portion of the rotating shaft 310. For example, in FIG. 16, the damping sheet 350 is disposed in an area between the dual-shaft fixing block 340 and the drive sheet 322.

Therefore, disposing the damping sheet in the rotating shaft connection mechanism can increase resistance during rotation of the rotating shaft. In this way, when the rotating shaft connection mechanism is disposed on the device, resistance during folding or unfolding of the device can be increased by using the resistance increased by the damping sheet during rotation of the rotating shaft, so that the device can maintain a stable state at any angle within a specific angle range during folding or unfolding of the device.

In this embodiment of this application, considering device assembly and size problems, the rotating shaft 310 may be relatively short in length, or the rotating shaft 310 is made relatively small. In this way, when the flexible screen is in the unfolded state, for an area in a direction parallel to an axial direction of the rotating shaft, a partial area of the flexible screen may be supported by using the rotating shaft 310, and an area other than the rotating shaft 310 in the flexible screen may not be well supported. In this way, the flexible screen may be damaged when a user presses the flexible screen during use.

Figure 22:
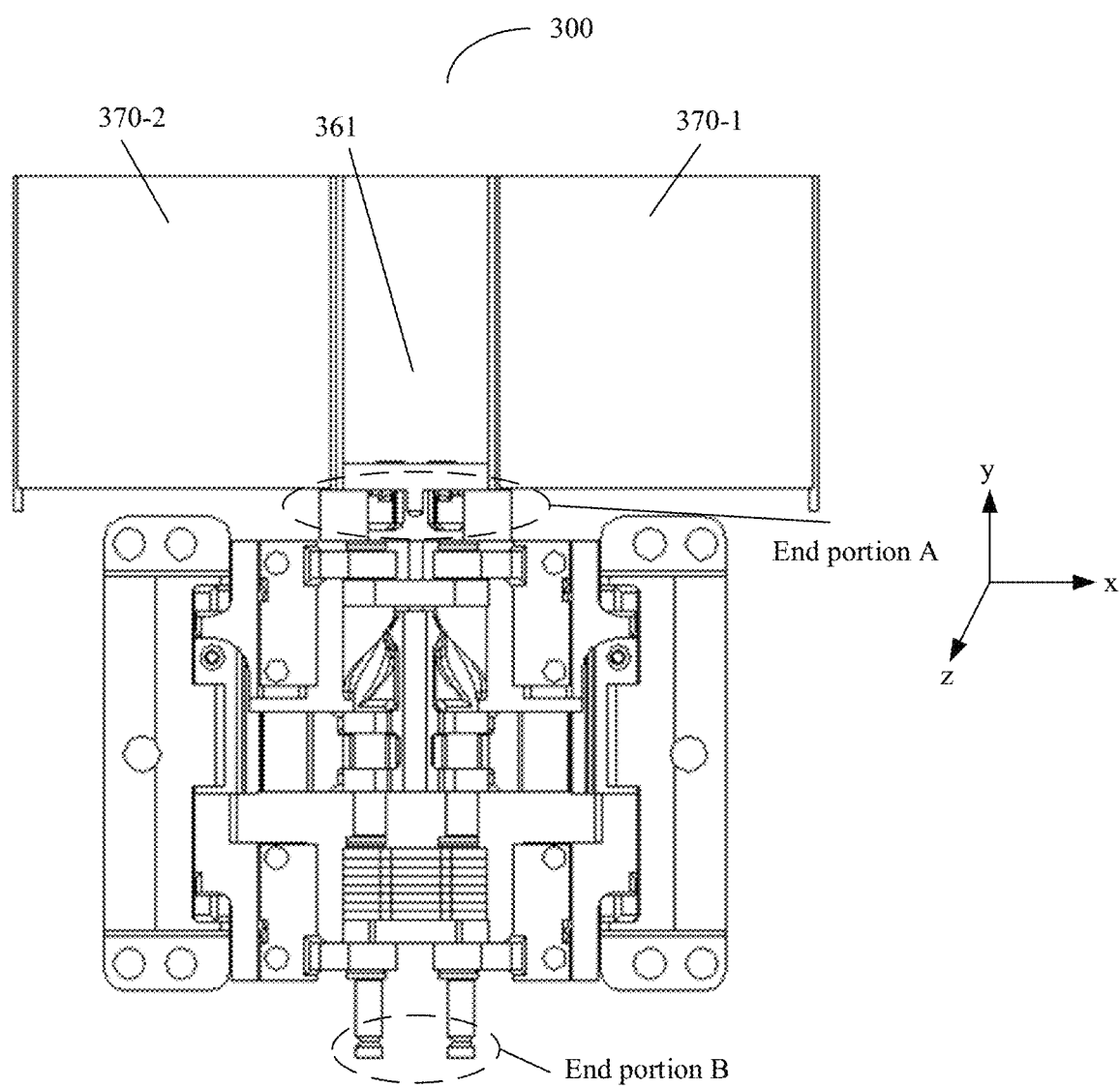
FIG. 22 is another top view of a rotating shaft connection mechanism in an unfolded state according to an embodiment of this application.
Figure 23:
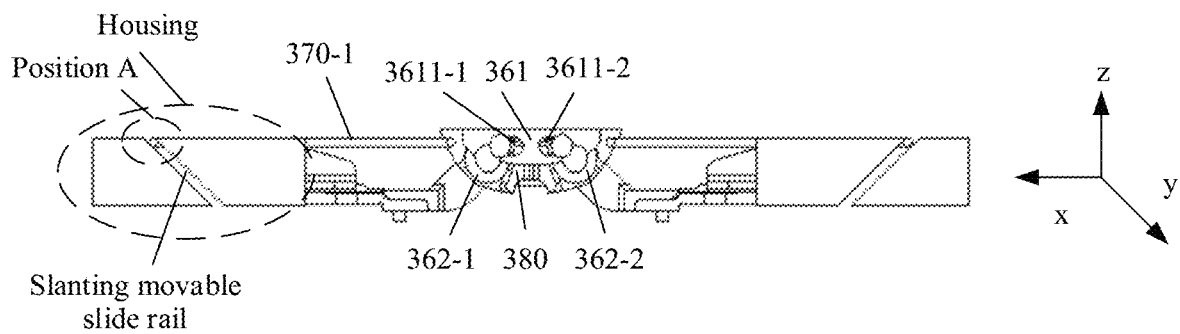
FIG. 23 is a main view of a rotating shaft connection mechanism in an unfolded state according to an embodiment of this application.
Figure 24:
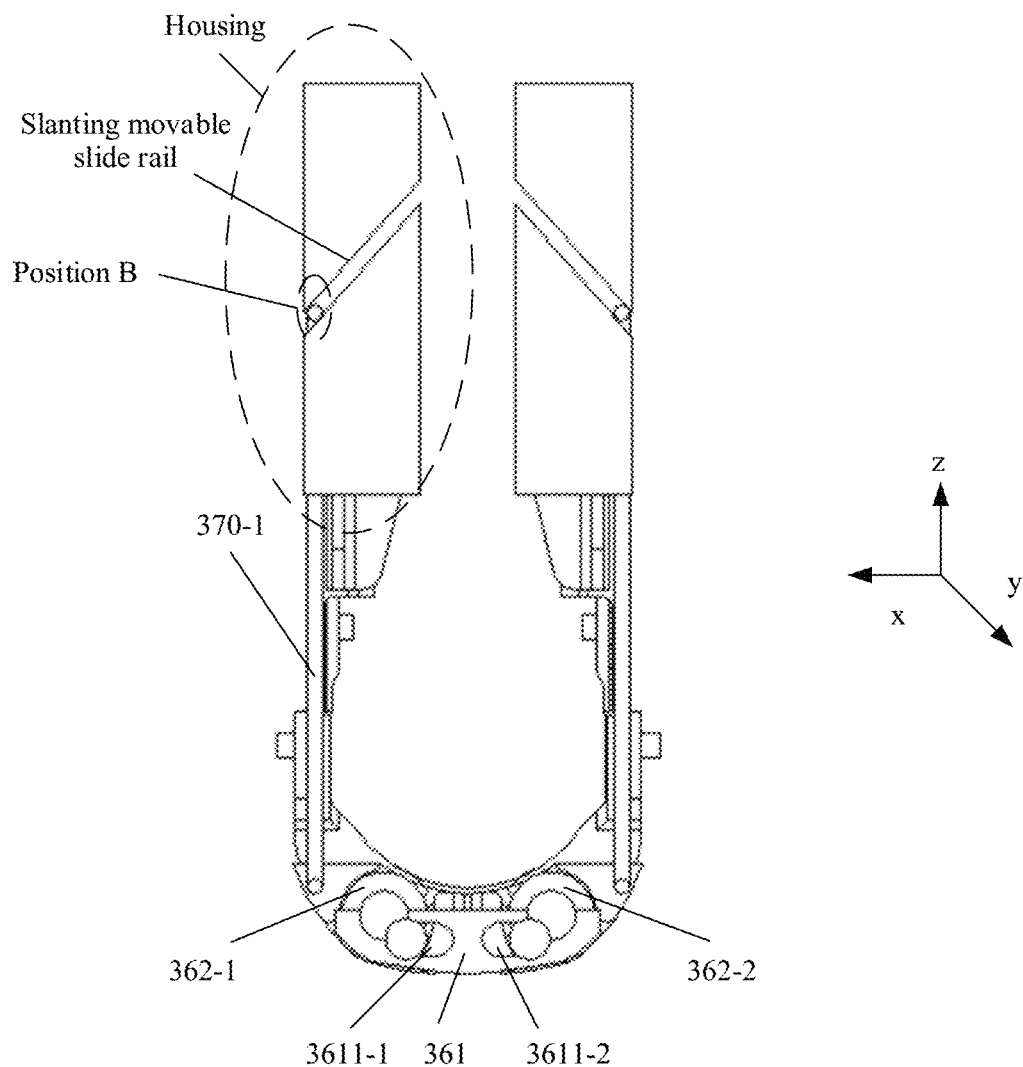
FIG. 24 is a main view of a rotating shaft connection mechanism in a folded state according to an embodiment of this application.

Therefore, when the flexible screen is in the unfolded state, to better support the flexible screen, referring to FIG. 22, FIG. 23, and FIG. 24, the rotating shaft connection mechanism in this embodiment of this application may further include a lifting block assembly. The lifting block assembly includes a screen support lifting block 361 and two eccentric wheels 362 corresponding to the two rotating shafts 310-1 and 310-2. The eccentric wheel 362-1 corresponds to the rotating shaft 310-1, and the eccentric wheel 362-2 corresponds to the rotating shaft 310-2.

The following describes in detail each component in the lifting block assembly.

At a same end of the rotating shaft 310-1 and the rotating shaft 310-2, the eccentric wheel 362-1 is fixed on the rotating shaft 310-1, and the eccentric wheel 362-2 is fixed on the rotating shaft 310-2.

The screen support lifting block 361 is slidably connected to both the eccentric wheels 362. For example, referring to FIG. 23, two sliding grooves 3611 (that is, a sliding groove 3611-1 and a sliding groove 3611-2) corresponding to the two eccentric wheels 362 are disposed on the screen support lifting block 361. The sliding groove 3611-1 corresponds to the eccentric wheel 362-1. The eccentric wheel 362-1 may be fixed to the sliding groove 3611-1 by using a dowel, so that the eccentric wheel 362-1 is slidably connected to the screen support lifting block 361. Similarly, the eccentric wheel 362-2 is also fixed to the sliding groove 3611-2 by using a dowel, so that the eccentric wheel 362-2 is slidably connected to the screen support lifting block 361.

In this way, when the two rotating shafts 310-1 and 310-2 rotate, each eccentric wheel 362 may rotate around a corresponding rotating shaft 310-1 or 310-2. Through a slidable connection between the eccentric wheel 362 and the screen support lifting block 361, the eccentric wheel can drive the screen support lifting block to move in the y direction (that is, the first direction).

For example, in FIG. 23, when the rotating shaft connection mechanism is in the unfolded state, the screen support lifting block 361 is towards a position at which the flexible screen is placed, and is configured to support an area of the flexible screen other than the rotating shaft. In FIG. 24, when the rotating shaft connection mechanism is in the folded state, the screen support lifting block 361 moves downward (or moves in the direction opposite to the y direction) to a position away from the flexible screen.

It should be noted that, in this embodiment of this application, one lifting block assembly or two lifting block assemblies may be disposed for one rotating shaft connection mechanism. Connection manners between the lifting block assemblies and the rotating shaft are the same. For details, refer to the foregoing descriptions of FIG. 23 and FIG. 24. When one lifting block assembly is disposed for the rotating shaft connection mechanism, the lifting block assembly is disposed on either of the two end portions of each of the two rotating shafts. For example, in FIG. 22, the lifting block assembly is disposed on an upper end portion (that is, an end portion A) of the rotating shaft. It may be understood that, the lifting block assembly may alternatively be disposed on a lower end portion (that is, an end portion B) of the rotating shaft. When two lifting block assemblies may be disposed for the rotating shaft connection mechanism, the two lifting block assemblies may be respectively disposed on two end portions (for example, an end portion A and an end portion B in FIG. 22) of the rotating shaft.

Figure 25:
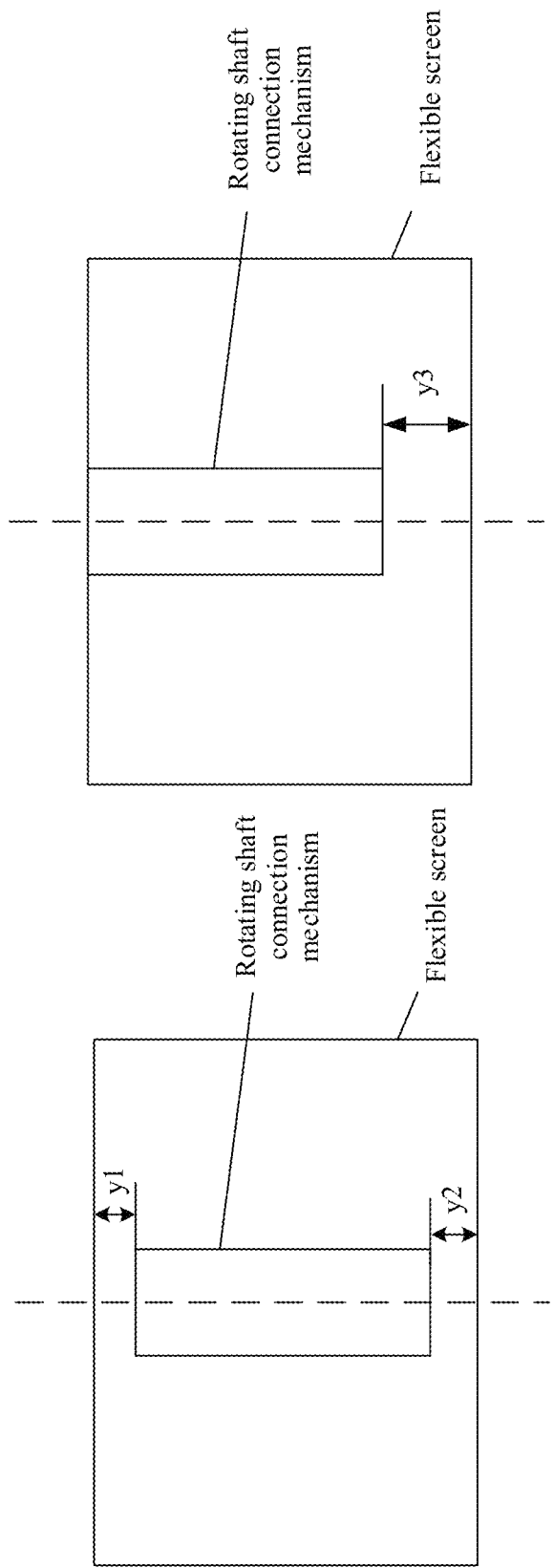
FIG. 25 is a schematic structural diagram of a position of a rotating shaft connection mechanism in a device according to an embodiment of this application.

It should be noted that, whether one or two lifting block components are disposed in the rotating shaft connection mechanism may be specifically determined based on positions of the rotating shaft connection mechanism and the flexible screen. For example, one rotating shaft connection mechanism is disposed on the device. Referring to FIG. 25, in a diagram on the left of FIG. 25, when there is a specific distance (for example, y1 and y2) between two end portions of the rotating shaft and two end portions of the flexible screen in the y direction, one lifting block assembly may be disposed on each end portion of the rotating shaft. In a diagram on the right of FIG. 25, there is a distance (for example, y3) between one end portion of the rotating shaft and an end portion of the flexible screen in the y direction. In this case, one lifting block assembly may be disposed on the end portion of the rotating shaft. Certainly, if there is basically no distance between the two end portions of the rotating shaft and the two end portions of the flexible screen in the y direction or the distance is within a preset range, no lifting block assembly may need to be disposed on the end portions of the rotating shaft.

Therefore, according to the rotating shaft connection mechanism provided in this embodiment of this application, the lifting block assembly including the eccentric wheel and the screen support lifting block is disposed on the rotating shaft, the eccentric wheel is fixed to the rotating shaft, and the screen support lifting block is slidably connected to the eccentric wheel. When the rotating shaft rotates, the eccentric wheel fixed to the rotating shaft rotates with the rotating shaft, and drives the screen support lifting block to move in the first direction parallel to the axial direction of the rotating shaft, thereby implementing good shaft support between the rotating shafts, providing a relatively good support force for the flexible screen, and improving user experience. In addition, because the lifting block assembly is connected to the rotating shaft, the rotating shaft connection mechanism also increases strength and anti-twisting performance of the device on the whole.

The lifting block assembly is used to provide a support force for an area of the flexible screen at an extension position of the end portion of the rotating shaft. Actually, when the rotating shaft connection mechanism is in the unfolded state, in the x direction, the flexible screen also needs to have a support force in areas on two sides of the rotating shaft connection mechanism.

Therefore, each connection assembly in this embodiment of this application further includes a screen support flap 370. There may be one or more screen support flaps 370 in each connection assembly. When each connection assembly includes one screen support flap 370, the screen support flap 370 may be disposed on any end portion of a corresponding rotating shaft. When each connection assembly includes two screen support flaps 370, the screen support flaps 370 may be disposed on two end portions of a corresponding rotating shaft.

Still with reference to FIG. 22, FIG. 23, and FIG. 24, the following also uses a screen support flap 370-1 in the connection assembly corresponding to the rotating shaft 310-1 as an example for description.

One end of the screen support flap 370-1 is connected to the rotating shaft 310-1. When the rotating shaft connection mechanism is disposed on the device, the other end of the screen support flap 370 is slidably connected to a slanting movable slide rail in the housing. When the rotating shaft 310-1 rotates, the screen support flap 310-1 may be driven to slide in the slanting movable slide rail. Specifically, as shown in FIG. 23, when the rotating shaft connection mechanism is in the unfolded state, an end portion of the screen support flap 370-1 is inserted into a position A of the slanting movable slide rail. When the rotating shaft starts to rotate, the slide rail block 321-1 or 322-2 starts to drive the housing to slide in the direction away from the rotating shaft 310-1. The sliding of the housing enables the end portion of the screen support flap 370-1 to slide in the slanting movable slide rail of the housing. As shown in FIG. 24, when the rotating shaft connection mechanism is in the folded state, the end portion of the screen support flap 370-1 slides to a position B of the slanting movable slide rail.

In this way, the screen support flap is disposed in the rotating shaft connection mechanism, so that after the flexible screen of the device on which the rotating shaft connection mechanism is disposed is in the unfolded state, the screen support flap may be used to provide a support force for the flexible screen, to support the flexible screen.

In this embodiment of this application, the screen support flap 370 may be connected to the rotating shaft 310 by using another component.

In one implementation, the rotating shaft connection mechanism further includes a fixing block 380 sleeved outside the two rotating shafts 310, and the screen support flap 370 is connected to the rotating shaft by using the fixing block 380.

There may be two designs for the fixing block 380. In a design, the fixing block 380 may be sleeved as a whole outside the two rotating shafts 310-1 and 310-2. In another design, one fixing block may be disposed at each rotating shaft 310-1 or 310-2, and each fixing block is sleeved on the corresponding rotating shaft 310-1 or 310-2.

Figure 26:
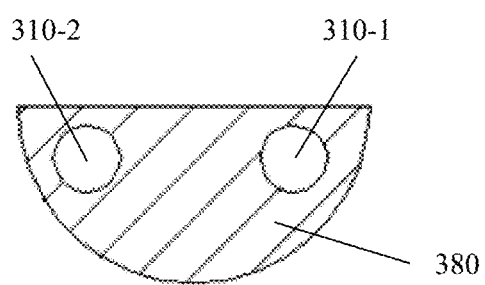
FIG. 26 is a schematic partial view of a joint between a rotating shaft and a fixing block in a rotating shaft connection mechanism according to an embodiment of this application.

In a first design, as shown in FIG. 26, a component that is sleeved on a shaded part outside the rotating shaft 310-1 and the rotating shaft 310-2 is the fixing block 380. The fixing block is sleeved on the rotating shaft 310-1 and the rotating shaft 310-2 as a whole. On the basis of FIG. 26, still referring to FIG. 23, the screen support flap 370-1 on the left is fixedly connected to the fixing block 380. Similarly, the screen support flap 370-2 on the right is also fixedly connected to the fixing block 380.

In a second design, the connection assembly further includes a fixing block 380 sleeved outside the corresponding rotating shaft 310, and one end of the screen support flap 370 is fixedly connected to the corresponding rotating shaft 310 by using the fixing block 380.

That is, the fixing block 380 is not sleeved outside the two rotating shafts 310 as a whole, but an independent fixing block is sleeved outside each rotating shaft. That is, two fixing blocks 380 are disposed in the rotating shaft connection mechanism, each rotating shaft 310-1 or 310-2 corresponds to one fixing block 380, each fixing block 380 is sleeved on a corresponding rotating shaft 310-1 or 310-2, and one end of the screen supporting flap 370 is connected to the rotating shaft 310 by using the corresponding fixing block 380.

Still referring to FIG. 5 and FIG. 6, an embodiment of this application further provides a foldable device. The device includes:

a foldable flexible screen 220; and
at least one rotating shaft connection mechanism 230, where each rotating shaft connection mechanism 230 is disposed under the flexible screen 220, and a slide rail block in each rotating shaft connection mechanism 230 is connected to a housing 210 of the device.

There may be one or more rotating shaft connection mechanisms 230. In one implementation, in FIG. 5, the at least one rotating shaft connection mechanism 230 includes two rotating shaft connection mechanisms 230 in a y direction (that is, a first direction). Each rotating shaft connection mechanism 230 is at a position towards an end portion of the housing of the device.

In some embodiments, in the y direction, the two rotating shaft connection mechanisms 230 are symmetrically disposed.

By way of example and not limitation, a quantity of rotating shaft connection mechanisms 230 may not be limited to two. For example, the device in FIG. 6 includes one rotating shaft connection mechanism, and the rotating shaft connection mechanism may be disposed at a middle position of the device in the y direction. For another example, the device includes three or more rotating shaft connection mechanisms, provided that an actual requirement is met.

For description of each rotating shaft connection mechanism, refer to the foregoing detailed description of the rotating shaft connection mechanism with reference to FIG. 7 to FIG. 5. For brevity, details are not described herein again.

It should be understood that one element described in various embodiments herein is "fixed to" another element, and the element may be directly or indirectly fixed to the another element. Similarly, an element described various embodiments herein may be "connected" to another element, directly or indirectly.

It should be further understood that one direction being "parallel" or "perpendicular" to another direction described in the embodiments of this application may be understood as being "approximately parallel" or "approximately perpendicular" to the another direction.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotating shaft connection mechanism, comprising:
two rotating shafts, two connection assemblies corresponding to the two rotating shafts, and one synchronous driving block, wherein the connection assembly comprises a slide rail block and a drive sheet, wherein
the rotating shafts are each provided with a spiral groove, and the spiral grooves on the two rotating shafts have opposite rotation directions;
the slide rail block is provided with a boss protruding towards the drive sheet;
the drive sheet is disposed between the slide rail block and the rotating shaft corresponding to the connection assembly, and is provided with a slanting groove enabling the boss of the slide rail block to be inserted, and a connecting piece is disposed on the drive sheet, wherein on a side that is of the spiral groove of the rotating shaft corresponding to the connection assembly and that is away from an end portion of the rotating shaft, the connecting piece is sleeved on the rotating shaft corresponding to the connection assembly; and
the synchronous driving block is disposed between the two rotating shafts, wherein a positioning protrusion part is insertable into the spiral groove of each rotating shaft, a first connecting piece and a second connecting piece that are sleeved outside each rotating shaft are sequentially disposed in a first direction, the first connecting piece and the second connecting piece are disposed on two sides of the connecting piece on the drive sheet, and the first direction is parallel to an axial direction of each rotating shaft.

2. The rotating shaft connection mechanism according to claim 1, wherein the slide rail block further comprises:
two grooves having openings facing opposite directions are respectively disposed at positions that are close to two end portions of the slide rail block in the first direction; and, wherein
the connection assembly further comprises:
a sliding sheet, disposed between the slide rail block and the rotating shaft corresponding to the connection assembly, and provided with two protruding end portions of the two grooves corresponding to the slide rail block, wherein each of the protruding end portions is inserted into a corresponding groove in the slide rail block, the sliding sheet is rotatably connected to the rotating shaft corresponding to the connection assembly, and the sliding sheet is slidably connected to the drive sheet in the first direction.

3. The rotating shaft connection mechanism according to claim 2, wherein the connection assembly further comprises:
  at least one sliding sheet fixing block, wherein each sliding sheet fixing block is rotatably connected to the rotating shaft corresponding to the connection assembly, and each sliding sheet fixing block is fixedly connected to the sliding sheet.

4. The rotating shaft connecting mechanism according to claim 3, wherein the rotating shaft corresponding to the connection assembly is a variable-diameter shaft, each sliding sheet fixing block is rotatably connected to a first part of the rotating shaft corresponding to the connection assembly, and a radius of the first part is less than a radius of a part provided with a spiral groove in the rotating shaft corresponding to the connection assembly.

5. The rotating shaft connecting mechanism according to claim 1, wherein the rotating shaft connection mechanism further comprises:
  a lifting block assembly, wherein the lifting block assembly comprises a screen support lifting block and two eccentric wheels corresponding to the two rotating shafts, wherein
  the two eccentric wheels are fixedly connected to a same end of each of the two rotating shafts respectively, and the two eccentric wheels are slidably connected to the screen support lifting block, so that when each of the rotating shafts rotates, the eccentric wheel corresponding to the rotating shaft rotates around the rotating shaft to drive the screen support lifting block to move in the first direction.

6. The rotating shaft connecting mechanism according to claim 1, wherein the connection assembly further comprises:
  a screen support flap, wherein one end of the screen support flap is fixedly connected to one end of the rotating shaft corresponding to the connection assembly, and when the rotating shaft connection mechanism is disposed on a device, the other end of the screen support flap is slidably connected to a slanting movable slide rail in a housing of the device, so that when the rotating shaft corresponding to the connection assembly rotates, the screen support flap slides in the slanting movable slide rail.

7. The rotating shaft connecting mechanism according to claim 6, wherein the rotating shaft connection mechanism further comprises a fixing block sleeved outside the two rotating shafts; and
  one end of the screen support flap in the connection assembly is fixedly connected to the rotating shaft corresponding to the connection assembly by using the fixing block.

8. The rotating shaft connecting mechanism according to claim 1, wherein:
  a direction of the slanting groove of the drive sheet in the connection assembly corresponding to each rotating shaft is opposite to a rotation direction of the spiral groove of each rotating shaft.

9. The rotating shaft connecting mechanism according to claim 1, wherein: a direction of the slanting groove of the drive sheet in the connection assembly corresponding to each rotating shaft is the same as a rotation direction of the spiral groove of each rotating shaft.

10. The rotating shaft connecting mechanism according to claim 1, wherein the rotating shaft connection mechanism further comprises:
  a damping sheet, at a position close to the end portions of the two rotating shafts, wherein the damping sheet is in interference fit with the two rotating shafts.

11. The rotating shaft connecting mechanism according to claim 1, wherein the rotating shaft connection mechanism further comprises:
  a dual-shaft fixing block, wherein the dual-shaft fixing block is rotatably connected to the two rotating shafts on one side of the spiral groove of each rotating shaft close to the end portion of the rotating shaft.

12. A foldable device, wherein the device comprises:
  a foldable flexible screen;
  at least one rotating shaft connection mechanism comprising:
  two rotating shafts, two connection assemblies corresponding to the two rotating shafts, and one synchronous driving block, wherein the connection assembly comprises a slide rail block and a drive sheet, wherein
  the rotating shafts are each provided with a spiral groove, and the spiral grooves on the two rotating shafts have opposite rotation directions;
  the slide rail block is provided with a boss protruding towards the drive sheet;
  the drive sheet is disposed between the slide rail block and the rotating shaft corresponding to the connection assembly, and is provided with a slanting groove that can enable the boss of the slide rail block to be inserted, and a connecting piece is disposed on the drive sheet, wherein on a side that is of the spiral groove of the rotating shaft corresponding to the connection assembly and that is away from an end portion of the rotating shaft, the connecting piece is sleeved on the rotating shaft corresponding to the connection assembly; and
  the synchronous driving block is disposed between the two rotating shafts, wherein a positioning protrusion part is insertable into the spiral groove of each rotating shaft, a first connecting piece and a second connecting piece that are sleeved outside each rotating shaft are sequentially disposed in a first direction, the first connecting piece and the second connecting piece are disposed on two sides of the connecting piece on the drive sheet, and the first direction is parallel to an axial direction of each rotating shaft; and
  wherein each rotating shaft connection mechanism is disposed under the flexible screen, and the slide rail block in each rotating shaft connection mechanism is connected to a housing of the device.

13. The foldable device according to claim 12, wherein the at least one rotating shaft connection mechanism comprises two rotating shaft connection mechanisms that are respectively disposed at positions close to two end portions of the housing of the device in a first direction, wherein the first direction is parallel to an axial direction of a rotating shaft in each rotating shaft connection mechanism.

* * * * *